(12) United States Patent
Primdahl et al.

(10) Patent No.: US 10,640,671 B2
(45) Date of Patent: May 5, 2020

(54) FRICTION COATINGS

(71) Applicant: SAFELOAD A/S, Holstebro (DK)

(72) Inventors: Poul Erik Primdahl, Holstebro (DK); Thomas Hedegaard, Hammel (DK); Johnny Mollerup Larsen, Aalborg (DK); Mogens Hinge, Temdrup (DK); Christoffer Bjerremand Hansen, Aarhus C (DK)

(73) Assignee: Pal-Cut A/S, Holstebro (DK)

( * ) Notice: Subject to any disclaimer, the term of this patent is extended or adjusted under 35 U.S.C. 154(b) by 236 days.

(21) Appl. No.: 15/811,305

(22) Filed: Nov. 13, 2017

(65) Prior Publication Data

US 2018/0066153 A1 Mar. 8, 2018

Related U.S. Application Data

(63) Continuation-in-part of application No. PCT/EP2016/060526, filed on May 11, 2016.

(30) Foreign Application Priority Data

May 11, 2015 (EP) .................................... 15167103

(51) Int. Cl.
| | | |
|---|---|---|
| C09D 133/10 | (2006.01) |
| C09D 7/61 | (2018.01) |
| C09D 135/06 | (2006.01) |
| D21H 19/14 | (2006.01) |

(52) U.S. Cl.
CPC ............. *C09D 133/10* (2013.01); *C09D 7/61* (2018.01); *C09D 135/06* (2013.01); *D21H 19/14* (2013.01)

(58) Field of Classification Search
None
See application file for complete search history.

(56) References Cited

U.S. PATENT DOCUMENTS 6,919,111 B2 * 7/2005 Swoboda ............... B65D 65/42
229/5.81

* cited by examiner

*Primary Examiner* — Sheeba Ahmed
(74) *Attorney, Agent, or Firm* — Oblon, McClelland, Maier & Neustadt, L.L.P.

(57) ABSTRACT

Products and methods aimed at ensuring that transported objects of cargo are held in place on the applicable transport vehicle during transport, enabled through the provision of friction surfaces based on styrene/acrylic copolymer compositions, which may be coated either directly on the surfaces of the applicable objects of cargo or the applicable transportation vehicle, or on one or both sides of sheets, e.g. in the form of paper- or cardboard-like material, resulting in high friction, anti-slip, anti-stick, scratch resistant, and heat resistant surfaces and/or friction sheets, enabling the reduction of shifting or slipping of objects of cargo during transport.

23 Claims, 9 Drawing Sheets

FRICTION COATINGS

CROSS REFERENCE TO RELATED APPLICATIONS

The present application is a continuation-in-part of PCT/EP2016/060526, filed on May 11, 2016, and claims priority to EP20150167103, filed May 11, 2015, the entire contents of which are incorporated herein by reference.

FIELD OF THE INVENTION

The present invention relates to the protection of cargo during transportation, e.g. by road, rail, ship and/or air freight. In particular the present invention relates to products and methods aimed at ensuring that transported cargo are held in place on the applicable transport vehicle during transport. This is enabled through the provision of friction surfaces based on styrene/acrylic copolymer compositions, which may be coated either directly on the surfaces of the applicable cargo or the applicable transportation vehicle, or on one or both sides of sheets, e.g. in the form of paper- or cardboard-like material, resulting in high friction, anti-slip, anti-stick, scratch resistant, and heat resistant surfaces and/or friction sheets, enabling the reduction of shifting or slipping of cargo during transport.

BACKGROUND OF THE INVENTION

Freight transport is important to all industries relying on the production of, and subsequent sale, of physical products. Thus, there is a constantly increasing need not only for efficient, but also safe freight transport. Both legal requirements and common sense dictate that cargo carried on vehicles are secured to protect the people involved in loading, unloading and driving the vehicle in question, the load itself and the vehicle. Cargo securing may be obtained in different ways, but basic principles would include securing the cargo in such a way that it cannot shove away, roll-over, wander due to vibrations, fall off the vehicle, or make the vehicle tip over.

Normally several method(s) will be considered when securing cargo, including locking, blocking, direct lashing, top-over lashing or combinations of these methods.

However, regardless of what general method(s) is (are) used, also the use of equipment, which further supports the cargo securing such as friction sheets/mats, walking boards and/or edge beams. is necessary in most circumstances.

In relation to the tendency of cargo to slide during transport the so-called frictional force, i.e. the force exerted between an object and a surface when the object moves across the surface or is influenced by forces resulting in an effort to move the object across the surface, is central.

The frictional force can be expressed as $$F_f = \mu F_n$$

Where, $F_f$=frictional force (N), $\mu$=coefficient of friction, and $F_n$=normal force (N). For a cargo object (i.e. goods), which slides or is pulled/pushed horizontally, the normal force—$F_n$—is proportional to the weight:

$$F_n = mg$$

Where, m=mass of the cargo object (kg) and g=gravitational constant.

The causes of friction, and thus the applicable static frictional coefficient ($\mu_s$) and dynamic frictional coefficient ($\mu_d$), may in principle be subdivided into three phenomena, namely molecular adhesion, surface roughness, and plowing.

Adhesion is the molecular force resulting when two materials are brought into close contact with each other. Trying to slide objects along each other requires breaking these adhesive bonds. Thus, when two objects are brought into contact, many atoms or molecules from one object are in so close proximity to those in the other object that molecular or electromagnetic forces attract the molecules of the two materials together. Trying to slide one object across the other requires breaking these adhesive bonds. Some materials may have a composition that greatly increases their adhesion and making them "sticky" to touch.

Surface roughness is a factor which contributes when the materials are rough enough to cause serious abrasion. All solid materials have some degree of surface roughness. If the surfaces of two hard solids are extremely rough, the high points or asperities can interfere with sliding and cause friction because of the abrasion or wear that can take place when you slide one object against the other. This may be viewed as a "sandpaper effect", where particles of the materials are dislodged from their surfaces. In such a case, friction is partly caused by surface roughness, although the adhesion effect still plays a part.

When one or more of the materials is relatively soft, much of the resistance to movement is caused by deformations of one of the objects or by a plowing effect. Soft materials will deform when under pressure. This also increases the resistance to motion. When materials deform, the harder material must "plow" through the softer material to move, thus creating a resistive force. When the deformation becomes large, such that one object sinks into the other, this can affect the friction.

During transport the static frictional forces resulting from the interaction of two surfaces, e.g. the surface of a vehicle and the surface of the cargo objects, will as a starting point act to prevent any relative motion of the relevant objects. The threshold of motion is characterized by the static frictional coefficient ($\mu_s$). Static friction resistance will normally match the applied force up until the threshold of motion. When two surfaces (e.g. the surface of a vehicle and the surface of the cargo) are moving with respect to one another, the frictional resistance is almost constant over a wide range of low speeds, and is characterized by the so-called dynamic frictional coefficient ($\mu_d$). In most cases it is easier to keep something in motion across a horizontal surface than it is to start it in motion from rest, which would indicate that the dynamic frictional coefficient ($\mu_d$) is less than or equal to the static frictional coefficient ($\mu_s$). On the other hand, the friction to be overcome to start motion (static friction) will in some scenarios (e.g. dry metals) not significantly exceed the force required to maintain motion (dynamic friction).

Dynamic and static frictional coefficients may be determined using a frictometer, which may e.g. be constructed, using a load cell connected to an analog to digital converter, which is again connected to a PC in order to obtain the data through a custom made software application.

A possible design of a frictometer capable of measuring friction relevant for transportation situations is depicted in FIG. 3.

The period of time that two objects are in contact with one another prior to being subjected to lateral forces may also play a role in relation to the resulting static frictional coefficient. This is important because varying resting time of cargo may apply in real life situations before an acting pressure is in fact applied. Thus, a cargo object might be five days underway to its destination before the method of transportation causes the object to experience a high amount of lateral force, in such case the resting time might result in sufficient static friction for the object to remain stationary. Another object could have just left the production facility when the same amount of lateral force is applied, resulting in a static friction that is not high enough to avoid motion and thus damage.

Also, the contact pressure acting on the coating is important, as the viscoelastic properties of a coating is expected to result in a decrease in static friction coefficient with increased contact pressure.

Contact between different materials will give rise to different coefficients of friction. Table 1 below shows standard values for static frictional coefficients, which are valid provided that both contact surfaces are dry, clean and free from e.g. frost, ice and snow.

TABLE 1

| MATERIAL COMBINATION | $\mu_s$ |
|---|---|
| TIMBER/WOOD | |
| Sawn timber against plywood/plyfa/wood | 0.5 |
| Sawn timber against grooved aluminum | 0.4 |
| Sawn timber against steel metal | 0.4 |
| Sawn timber against shrink film | 0.3 |
| Brick against Wood | 0.6 |
| Cast against Iron Oak | 0.5 |
| Hemp rope against Timber | 0.5 |
| Leather against Oak | 0.6 |
| Leather against Wood | 0.4 |
| Oak against Oak (parallel grain) | 0.6 |
| Oak against Oak (cross grain) | 0.5 |
| Wood against Concrete | 0.6 |
| SHRINK FILM/NYLON/POLYSTYRENE/RUBBER | |
| Shrink film against plyfa | 0.3 |
| Shrink film against grooved aluminum | 0.3 |
| Shrink film against steel metal | 0.3 |
| Shrink film against shrink film | 0.3 |
| Nylon against Nylon | 0.2 |
| Polystyrene Polystyrene | 0.5 |
| Rubber against Rubber | 1.2 |
| PAPER CARDBOARD (UNTREATED) | |
| Cardboard against cardboard | 0.5 |
| Cardboard against wooden pallet | 0.5 |
| Rubber against Cardboard | 0.8 |
| BIG BAG | |
| Big bag against wooden pallet | 0.4 |
| STEEL AND SHEET METAL | |
| Flat steel against sawn timber | 0.5 |
| Unpainted rough sheet metal against sawn timber | 0.5 |
| Painted rough sheet metal against sawn timber | 0.5 |
| Unpainted rough sheet metal against unpainted rough sheet metal | 0.4 |
| Painted rough sheet metal against painted rough sheet metal | 0.3 |
| Painted metal barrel against painted metal barrel | 0.2 |
| Bronze against Steel | 0.2 |
| Carbon against Steel | 0.1 |
| Leather against Metal | 0.4 |
| Paper against Cast Iron | 0.2 |
| Plexiglas against Steel | 0.5 |
| Polystyrene against Steel | 0.4 |

As is evident from the values reported above most combinations, apart from those involving rubber, give rise to static frictional coefficients either at or below 0.6.

SUMMARY OF THE INVENTION

As set out above use of friction coatings, e.g. in the form of sheets/mats coated with a friction coating to increase friction (i.e. the friction between the surface of cargo vehicle and the cargo, and between layers of cargo objects if so required) will normally be considered when securing cargo during transport, and the use of friction sheets/mats (and the accompanying increase of the applicable frictional coefficient) will normally allow for a reduction in the number of lashings otherwise required.

Different types of friction coatings and friction sheets/mats are known in the art, for example carpets, rubber mats and sheets of paper (also known as slip-sheets) coated with a material designed to increase friction.

In applying friction coatings, e.g. in the form of friction sheets/mats, it is important to ensure that properties such as friction, strength, thickness and granularity. of the mats/sheets used are commensurate with both the load (weight and surface) of the cargo and the environmental conditions (temperature and humidity) likely to be encountered during the journey.

Friction coatings and sheets/mats already known in the art would inter alia include the rubber-based Regupol Load Secure™ and friction mats produced by Regupol and reported to have static friction coefficients of 0.80-1.05, RUBBERTECH SPECIAL™, PROTECT™, and SECURE™ anti-slip mats produced by RUBBERTECH, reported to have (dynamic) friction coefficients of 0.62-1.05, anti-slip STABULON™ paper and cardboard sheets produced by CGP reported to provide sufficient friction up to an angle of 42° (which would through the relationship $\mu_s$=tan (42°) entail a static friction coefficient of 0.9), and anti-slip paper and cardboard sheets produced by W.Bosch+Co reported to have friction coefficients of >0.60. The material used is conventionally cut off in strips of 5 to 20 m length and 150, 200 or 250 mm width, whereas the thickness ranges from 2 to 20 mm.

WO94/26513A1 discloses certain coating compositions and their use for coating certain substrates, which (i.e. the substrates) are described as having a basis weight in the range of 80 to 300 lbs per 3,000 sq.ft. and a thickness in the range of 0.008 to 0.0025 inches. The amount of coating to be applied to these substrates according to WO94/26513A1 is disclosed in terms of a dry coating weight (cf. claim 9 and page 5 lines 25-30). All of the examples of WO94/26513A1 relate to coatings based on the commercial acrylic-styrene copolymer emulsion Rhoplex®P-376 mixed with another acrylic polymer emulsion, Rhoplex B-85®. Even if the composition of Rhoplex®P-376 is further described in WO94/26513A1 at page 8 line 11 to 22, and that of Rhoplex B-85®, on page 8 line 31 to page 9 line 5, the molar content of the acrylic parts and the styrene parts of these copolymer emulsions is not disclosed (and consequently neither does it describe the molar ratio between the two). The water based emulsion coating compositions disclosed in the examples comprise a mixture of Rhoplex®P-376 and Rhoplex B-85® in varying ratios indicated as approximate % wet coating weight but does not provide any information regarding the composition of Rhoplex®P-376 and Rhoplex B-85®. Conclusively, neither the thickness of the coatings of WO94/26513A1 nor the molar content of the acrylic parts and the styrene parts of thee coatings of WO94/26513A1 are disclosed in WO94/26513A1.

As may be seen from the above, there is a continued need for alternative friction coatings, which provide both an increased frictional coefficients (and thereby ensures that cargo objects have a good grip under transportation when stacked on pallets, or on each other), and moderate adhesion (and thereby ensures that the cargo objects are still easily unloaded when they reach their destination), while at the same time providing scratch resistance, high heat resistance, and low weight. Thus, it would be desirable to provide alternative friction coatings that fulfill all of the above needs whether i) used directly on either the cargo or the surface of the cargo vehicle as such, or ii) used as a coating for friction sheets/mats.

Thus, in the context of the above it is an objective of the present invention to provide friction coatings, which at the same time show a moderate adhesion for applications where it is important that the object experiences both a firm grip to the desired surface, but also does not stick to it, which would otherwise be the result of exaggerated adhesive properties. As regards to the static friction coefficient it should, in order to fulfill the needs of practical use, be at least as high as 0.6, see e.g. German conference by TÜV, Technischer Überwachungs-Verein (2013).

In line with the above, the term friction coating is in the context of the present invention to be understood as a coating resulting in a static friction coefficient (when measured as described herein) of at least 0.6 and preferably above 0.6.

It is a further objective of the present invention to provide objects, e.g. cargo, the surface of which is at least partly coated with a friction coating in accordance with the above.

It is a still further objective of the present invention to provide friction sheets, e.g. made from a paper or cardboard material, the surface of which is at least partly coated with a friction coating in accordance with the above.

It is a still further objective of the present invention to provide the use of objects, e.g. cargo, the surface of which is at least partly coated with a friction coating in accordance with the above, for securing cargo during transport.

It is a still further objective of the present invention to provide the use of friction sheets, e.g. made from a paper or cardboard material, the surface of which is at least partly coated with a friction coating in accordance with the above, for securing cargo during transport.

It is a still further objective of the present invention to provide a method of placing a cargo object on a surface of a transportation vehicle to increase friction between this cargo object and the surface of a transportation vehicle during transport, wherein either the cargo object, the surface of the transportation vehicle or a friction sheet placed in between the cargo object and the surface of the transportation vehicle is at least partly coated with a friction coating in accordance with the above.

All of the above objectives are achieved by the present invention by the provision of objects or surfaces, which are coated at least partly with the herein defined friction coatings. In a preferred embodiment the coated objects of the invention are friction sheets, preferably made of a paper or cardboard material, coated on one or both sides with a styrene/acrylic copolymer coating, resulting in friction sheets displaying high friction coefficients, while at the same time being non-sticky (i.e. showing only a moderate adhesion) and thereby showing an enhanced grip on relevant surfaces, practically eliminating shifting or slipping of goods/cargo during transport, while at the same time allowing easy unloading of cargo objects when these reach their destination.

Since a high surface roughness limits contact area, soft materials, like rubbers, have typically been used to obtain high friction. Presently, the most widely used friction sheets are based on costly rubber mats. However, this is impractical and costly; I) due to the cost of the rubber mats they are occasionally re-used and transported back after use, II) they add to the transport costs because of weight and space consumption.

In contrast the present invention provides objects coated at least partly with a styrene/acrylic copolymer and preferably objects in the form of sheets based on paper or cardboard material coated at least partly with a styrene/acrylic copolymer, which are not subject to the same restraints as rubber mats as regards costs. The preferred coated friction sheets can furthermore, in a preferred embodiment, be attached onto the applicable cargo objects by use of an additional coating applied to one side consisting of a heat sensitive polymer, e.g. based on polyethylene, whereby transport costs can be significantly reduced and safety is increased since any possible wrong application of the friction sheets is thereby eliminated entirely.

It is broadly recognized within the filed of the present invention that the addition of a so-called filler to a polymer-based friction coating may further reduce the applicable cost, as the cost of such fillers are generally lower than that of polymer materials, just as adding a filler may contribute to reducing the energy input needed in the production of friction sheets coated with the applicable coating, e.g. as a consequence of a reduced requirement for drying. However, similarly it is generally recognized that the impact on the friction coefficient (the static as well as the dynamic) of adding a filler to a friction coating will depend on as well the composition of the friction coating and the filler in question, i.e. the chemical and physical characteristics of the specific co-polymer and filler used, as the amount of filler added to the coating (see e.g. Yadav et al, JERS/Vol. II/Issue IV/October-December 2011/178-182). Thus, even if adding a filler may from an overall point of view be considered generally desirable, identifying the exact type and amount thereof, which would be beneficial in the context of a given friction coating based on a given co-polymer composition, is normally far from trivial.

In addition the coating of the present invention fulfills the applicable standard criteria related to coated paper for packaging in the secondary food packaging industry and the mineral water industry (e.g. certification by ISEGA Germany).

DETAILED DESCRIPTION OF THE INVENTION

Figure 1:
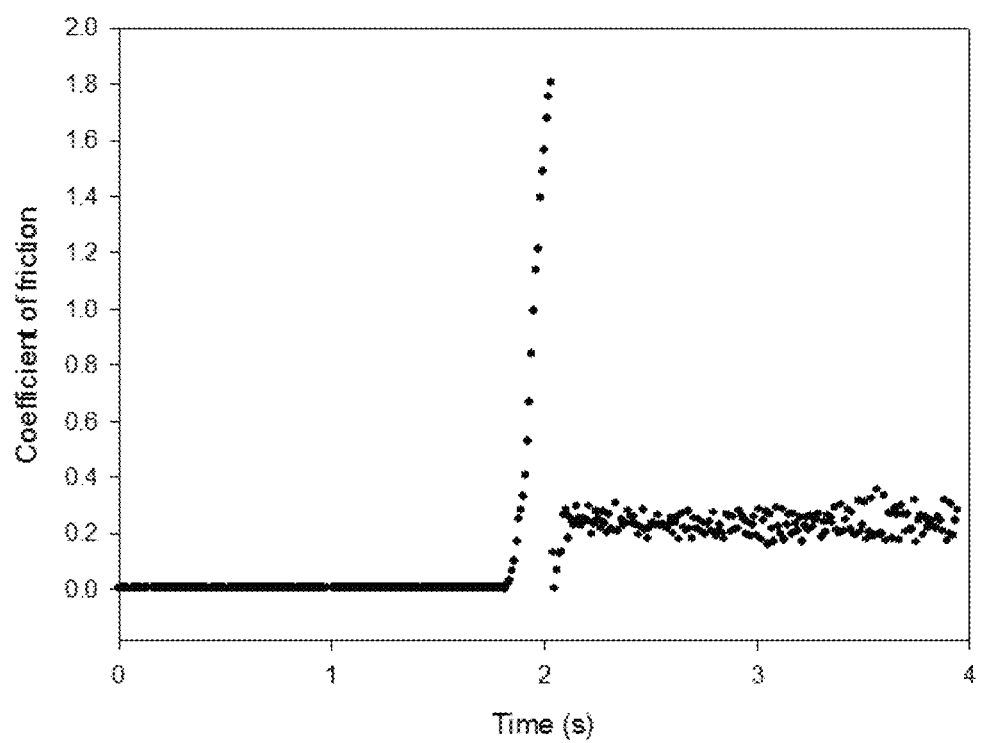
FIG. 1: Typical measurement series using a frictometer. Software logging is started at time=0. After 1.8 seconds the frictometer is turned on, and at 2 seconds the maximum coefficient of friction is obtained at the value 1.8. After around 2.2 seconds, the friction coefficient is stabilized around the value 0.25.

The present invention provides friction coatings based on styrene/acrylic-copolymers. These coatings may inter alia be used i) directly on the surfaces of cargo objects or the surfaces of cargo vehicles as such, or ii) as coatings on sheets to be used as friction sheets.

In principle the sheets to be coated with the friction coatings according to the present invention may be made from any applicable material. In practice, however, friction sheets of this kind are usually produced from a paper/cardboard material. Thus, in a preferred embodiment, friction sheets according to the present invention are made from paper or cardboard sheets, at least partly coated with a friction coating according to the present invention. Regardless of the material from which the friction sheets are produced, friction sheets of the present invention will usually include at least a partial coating on at least one side of the sheet with a coating giving rise to an increased friction coefficient.

In a particularly preferred embodiment the present invention is aimed at providing approved coatings for sheets made from a paper or cardboard material that are to be used as friction sheets.

Several parameters must be accounted for in the context of arriving at high friction coatings, e.g. in the form of coated paper or cardboard sheets applicable as friction sheets for transportation purposes. These would include both properties of the finished coating, but also properties of the material on which the coating is to be coated, e.g. a wooden pallet or sheet of paper or cardboard, and the properties of the polymer dispersion to be used during the coating process.

Key parameters would include:
material properties, including interplay between chemical composition of polymers and the principal material of the object to be coated,
coating application, including coated layer thickness, viscosity and polymer fraction of coating dispersion, drying temperature, drying time,
choosing applicable material of solid counterface for determining static and dynamic friction coefficients, sliding velocity,
resulting hardness of coated surface (adhesion), applicable contact pressure per area,
resulting heat resistance, wear properties (scratch resistant).

A key parameter to be determined in the identification of applicable polymers would be identifying properties relevant for the ability of polymers to attach to the principal material of the objects to be coated, e.g. the wooden pallet, paper or cardboard surfaces.

As regards friction coefficients the static friction coefficient is more important than the dynamic friction coefficient, because the latter specifies the frictional properties when the transported cargo is in motion, which they are not intended to be in the first place.

Another important property is the adhesion properties of the coated surface, as this is important when the coated objects, e.g. the paper-based friction sheets are to be used for their intended purpose, as a great amount of adhesion between two separate objects, e.g. friction sheets, might result in application difficulties. Thus, the adhesion would have to be large enough to contribute to a satisfactory friction coefficient, but at the same time low enough to have a practical application.

Heat-, water-, and scratch resistance are also important coating properties. The heat resistance is especially important when the friction coating is to be applied for the coating of friction sheets that are to be used in embodiments where these sheets are to be attached to cargo by means of a heat sensitive glue, e.g. based on Polyethylene (PE). In such scenarios the coating applied for friction should be able to withstand conditions corresponding to around 170-250° C. for 10-15 seconds of direct metal contact, which would not be possible in case of most of the friction coatings commonly used today.

Applicable Surfaces

Ideally relevant coatings should be capable of adhering/binding to a number of surfaces, since the material used for both cargo objects and the surfaces of cargo vehicles may vary significantly.

In practice, however, the surfaces of most cargo objects (whether as such or packaged on pallets) and the surfaces of most cargo vehicles will be based on cellulosic material. Furthermore, as mentioned above one of the most common sheet materials used for friction sheets (apart from rubber) in the prior art is paper or cardboard, which are also mainly made from cellulose, hemicellulose and/or lignin. Cellulose is a linear array of multiple D-Glucose units bonded together with 1,4 β glycoside linkages. Hemicellulose is also made of glucose, but in contrast to cellulose, it consists of several other sugars such as xylose or mannose, and the molecule structure is amorphous. Lignin is a complex polymer of aromatic alcohols. All of these macromolecules comprise —OH groups in the form of alcoholic, hemiacetalic, carboxylic or phenolic groups. In addition the paper making process will normally include a sulfite pretreatment of the relevant material, which will leave sulfonic acid groups in the lignin. Thus, in most cases the surface of paper or cardboard material will be negatively charged.

Figure 2:
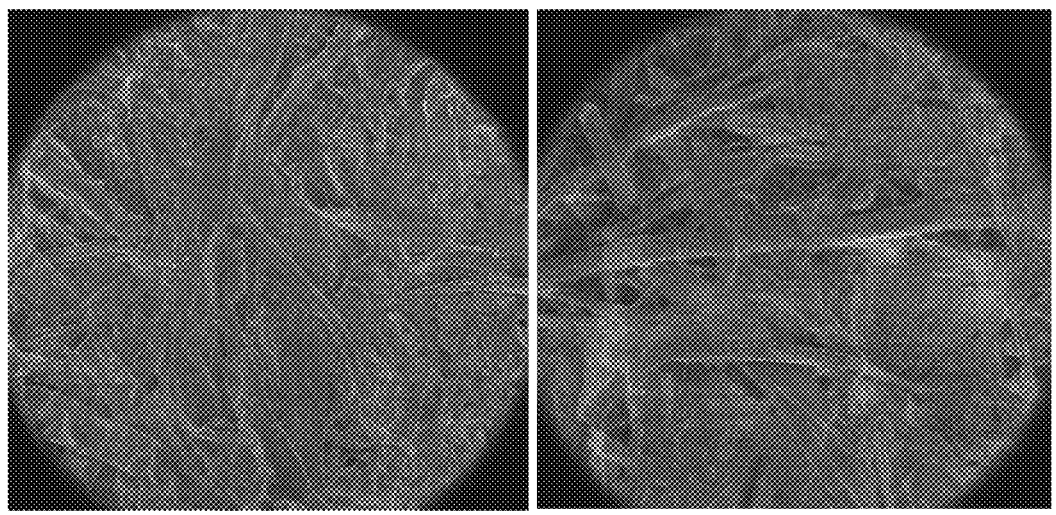
FIG. 2: Scanning electron microscope (SEM) picture at 500 times magnification of a typical cardboard material used for prior art friction sheets. To the left; the more compact side. To the right; the more porous side. The lens used has a diameter of around 600 μm.

The paper or cardboard material used in prior art friction sheets typically has a more porous and a more compact side. This is visualized e.g. in FIG. 2, showing a scanning electron microscope (SEM) picture at 500 times magnification of a typical cardboard material used for prior art friction sheets.

As this might have an impact when coating either of the two sides (i.e. considering that more polymer coating material would be needed to achieve the same layer thickness when coating the more porous side compared to the more compact side), the more porous side was chosen for all experiments, described below, also because prior art friction sheets are normally coated on that side.

Applicable Objects

In the context of the present invention objects coated with a friction coating according to the present invention may be of any physical form that is visible or tangible and is relatively stable and has surfaces in 3 dimensions; e.g. x, y and z.

In preferred embodiments of the present invention an object according to the invention will be solid and will have a relatively large plane face, also referred to as the base of said object, and its overall surface will be defined further by faces intersecting in lines.

Geometrical shapes of relevance to objects according to the present invention would include, but are not limited to:

Prisms: objects with two congruent and parallel faces, e.g. in the form of rectangular prisms, e.g. in the form of cubes or sheets. Objects of the present invention may, however, also be in the form of e.g. triangular octagonal or hexagonal prisms.

Pyramids: objects with a polygon (e.g. triangular or square) base and triangle sides.

Cylinders: objects with two parallel circular bases.

Cones: objects with a circular base and a curved side that ends in one point.

Spheres: objects where all points on the surface are at an equal distance from the center point.

Torus: objects which surface is generated by revolving a circle in three-dimensional space about an axis coplanar with the circle.

In preferred embodiments according to the present invention objects would include, but are not limited to, sheets, rolls (e.g. paper rolls), drums, boxes, bags, bales, sacks, pallets (e.g. wheel pallets or Euro-pallets), beams, coils, rods, tires or bars.

In certain preferred embodiments, e.g. sheets, one dimension of the object coated with a friction coating according to the invention, e.g. x, might be relatively minute as compared to the other two dimensions of the object, e.g. y and z. Also, in certain preferred embodiments, e.g. sheets, one of the dimensions of the object coated with a friction coating according to the invention, e.g. y, might be relatively extensive as compared to the other two dimensions, e.g. x and z. Thus, in certain preferred embodiments, e.g. sheets, the object might present itself in a form, where not all surfaces, e.g. coated surfaces, are immediately accessible. Thus, sheets might present themselves in the form of rolls rather than in the form of individual sheets.

In the context of the present invention the size of the surface area of an object, whether in whole or in part, is preferably defined in $m^2$.

Film Thickness

In the context of the present invention wet thickness or wet film thickness (WFT) is the thickness of a polymer coating dispersion once applied to the surface of the object to be coated. Wet thickness is at its peak right after the application of the polymer coating dispersion. It decreases once volatiles from the coating film undergo evaporation. Measuring wet film thickness is necessary to identify the amount of coating dispersion that needs to be applied to achieve a particular dry thickness or dry film thickness (DFT) after curing/drying.

In the context of the present invention, dry thickness or dry film thickness (DFT) is the thickness of a polymer coating as measured above the object to which the polymer coating has been applied. Dry thickness or dry film thickness (DFT) is measured for cured coatings (i.e. after the polymer coating has dried or has been dried and cured). This can consist of a single layer or multiple layers.

As will be well know to those skilled in the art of coating, the dry thickness of a coating will depend on both the polymer dispersion applied and the type of process employed. Thus, a desired thickness could be obtained in numerous ways by adjusting coating system parameters, such as polymer fraction and density. Thus, by way of example a given dispersion employed in a given process at a given wet thickness (WFT), will in the simplest scenario, (i.e. where the applicable drying/curing does not result in any reduction of the volume of the polymer used for coating and wherein no filler/thinner has been added to the dispersion), result in a given dry thickness (DFT) according to the following formula, wherein P is the polymer fraction (v/v) of the dispersion used.

$$DFT=WFT*P$$

Main standards used for dry thickness or dry film thickness (DFT) measurements would include SSPC-PA 2, Australian Standard AS 3894.3, International Standard ISO 19840 and the International Maritime Organization (IMO) resolution MSC 215(88). However, also scanning electron microscopy images can be used to determine coating thickness, just as simple cutouts of coated paper can be used to statistically estimate the coating thickness by weighing the cutouts before and after coating (cured).

In the context of the present invention coating thickness (whether wet or dry) is preferably specified in µm.

The actual thickness of the wet film (WFT) when a coating according to the invention is applied may be e.g. app 60 µm. The wet thickness of the coating may, however, as in the friction coatings and friction sheets of the prior art, vary depending of the specific intended application of the coating or sheet, and the thickness may be from 2-100 µm, such as 4-90 µm, e.g. 5-80 µm, such as 6-70 µm, preferably 10-70 µm and more preferably 20-60 µm.

Depending on the specific conditions (e.g. polymer fraction (v/v) of the dispersion) applied for the coating the resulting dry layer thickness may be from 1-50 µm, such as 2-45 µm, e.g. 3-40 µm, such as 3-35 µm, preferably 5-30 µm and more preferably 10-25 µm.

Drying

The applied coating is to be sufficiently dried before use and before measuring the static friction coefficient. Sufficient drying is obtained when no more loss of mass can be recorded over time. The drying method applied may differ in relation to the various coating scales. In the laboratory scale the coating can be dried in an oven at a sufficiently high temperature, e.g. more than 100° C., whereas at continuous coating at full scale the drying method might rely on IR heating elements, convection drying panels with hot air, and/or diffusion drying. The skilled person would also be aware of other methods which might result in the required drying of the coating.

Dry Coating Weight

In the context of the present invention the dry coating weight is defined as the weight gain of the object per surface area, when the coating according to the invention has been applied and then dried/cured. In the context of the present invention dry coating weight is preferably specified in g coating/(m² coated surface).

The actual weight gain of an object, when the coating according to the invention is applied and then dried may be more than 25 g/(m² coated surface). The weight of the coating may, however, as in the friction coatings and friction sheets of the prior art, vary depending of the specific intended application of the coating or sheet, and the weight might be e.g. from 3-50 g/(m² coated surface), such as 4-40 g/(m² coated surface), preferably 5-30 g/(m² coated surface), and even more preferably 6-25 g/(m² coated surface).

Molar Ratio

In the context of the present invention, the molar ratio is the amount of a constituent, e.g. a monomer, (expressed in moles) relative to the amount of all constituents, e.g. including another monomer, in a mixture, e.g. a polymer, in moles.

In the context of the present invention the mole percent or molar percentage (mol-%) is the molar ratio as defined above expressed with a denominator of 100.

Glass Transition Temperature (Tg)

The glass transition temperature, Tg, is the temperature at which a given polymer goes from an amorphous rigid state to a more flexible state. In the context of the present invention, the glass transition temperature may be determined by observing the temperature dependency of the heat capacity of the relevant polymer, i.e. by performing a differential scanning calorimetry (DSC) analysis. Based on a typical DSC curve, $T_g$ is defined as the temperature at the half-height of the heat capacity increase (highest reproducibility; preferred point), also called the "temperature of half—unfreezing", which is very close to the temperature at the inflection point.

In the context of the present invention any mentioning of individual glass transition temperatures, e.g. 10° C., will refer to the temperature at the half-height of the heat capacity increase (Tg) within an accuracy of +/−2° C., just as any mentioning of glass transition temperature intervals, e.g. −10 to 50° C., will refer to the temperature at the half-height of the heat capacity increase, Tg, both as far as the higher temperature of the interval is concerned and as far as the lower temperature of the interval is concerned, and again within an accuracy of +/−2° C.

Measurements on DSC may be performed on a Perkin Elmer DSC 8000, with a heating/cooling rate of 20° C./min and a rest on extreme temperatures of 1 min. Vented cups may be used.

Copolymer Dispersions According to the Present Invention

Copolymer dispersions are dispersions (e.g. emulsions) of polymer microparticles in a liquid media, e.g. an aqueous medium. The particle size will usually vary between 3 nm and 1000 µm, e.g. 50 nm-300 µm, such as 100 nm-1 µm, and the solid content will usually be below 90%, e.g. up to 70%, such as up to 65%, e.g. 50%. In addition copolymer dispersions according to the present invention may comprise traditional additives well known in the art of coating such as initiators, surfactants, non-surfactant stabilizers, chain transfer agents, buffering agents, inert salts or other fillers and preservatives, e.g. in the form of fumed silica, aluminum trihydroxide, calcium carbonate, Fillite, Noblite microspheres.

As mentioned above, the effect on the static and dynamic friction coefficients of adding fillers to a given polymer-composition would be expected to vary in a non-trivial way as a consequence of the specific filler added and not least the amount of filler added. As is evident from the results presented below in examples 3 and 4, however, the coatings of the present invention are, regardless of the specific ratio of dispersion A (high ratio between acrylic and styrene parts) to dispersion B (low ratio between acrylic and styrene parts), characterized by being capable of accommodating relatively large amounts of different fillers, i.e. from 10 and up to 50%, without a concomitant dramatic effect on the resulting friction coefficients, in particular as regards the dynamic friction coefficient. As is also evident from the results presented below, the commercial calcium carbonate based products MYANIT™ from JANCON ApS, and Rollovit™ from Lhoist and the silicon dioxide based Europerl from Nordisk Perlite Aps are at present particularly preferred as fillers in the context of the coatings of the present invention. Fillers made from mixtures of calcium carbonate based Rollovit and silicon dioxide based Eurperl Perlite are particularly preferred.

Rollovit and Myanit are a commercially available limestone-based and marble-based fillers. They primarily consists of $CaCO_3$ (calcium carbonate) and varying amounts of $MgCo_3$ (Magnesium carbonate) and are available in particle sizes of 0-0.04 mm and a density of 0.06-0.1 g/cm³

Perlite (e.g. Europerl Perlite from Nordisk Perlite Aps) is based on a naturally occurring amorphous volcanic glass containing mostly $SiO_2$ (Silicon dioxide). It is heat-treated at 1100° C. to evaporate trapped water, thus expanding the granulate 20 times to give a large particle size white powder with a density of 0.04 to 0.1 g/cm³. Commercial Perlite is available in several different grades with varying particle sizes, e.g. 0-1 mm, 0-1.5 mm, 0.5-1.5 mm and up to 6 mm.

In the context of the present invention a filler, which is a mixture comprising a silicon dioxide based filler and a calcium carbonate based filler, wherein the relative ratio of the silicon dioxide based filler to the calcium carbonate based filler is in a range from 1:1 to 1:3, such as 1:1.5 to 1:2.5, e.g. 1:2 to 1:2.5 or 1:1.5 to 1:2, is particularly preferred.

The polymer content of the dispersion used in the coating of objects according to the present invention may be in the range from 10-70% before application, but is preferably in the range from 15-65%, more preferably in the range from 20-60%, even more preferably in the range from 25-55%, even more preferably 30-50%, even more preferably 35-50, even more preferably 40-50% and most preferably 45-50%.

In a preferred embodiment the coating is performed with a mixture of two styrene/acrylic-copolymer dispersions, A and B, where the polymer content of the two dispersions is the same but where the ratio between the styrene and acrylic parts of these dispersions is different and the exact mixture used will thus determine the resulting hardness/smoothness of the coated surface. Greater amount of styrene will increase the rigidness of the molecular structure, thus making the surface harder, and in the end reduce the adhesive character of the coating. In this embodiment the A/B ratio, i.e. the ratio of polymer dispersion A (high ratio between acrylic and styrene parts) to dispersion B (low ratio between acrylic and styrene parts) will be decisive in relation to the final product obtained.

Thus, if e.g. pure dispersion A is deemed unpractical due to very high adhesion between coated sheets when stacked on top of each other, dispersion B can be mixed with dispersion A in order to reduce adhesion. This may be done in a ratio of choice, which will vary depending on the specific circumstances but will typically be from 20/80 v/v to 80/20 v/v, such as from 30/70 v/v to 70/30 v/v, that is 40/60 v/v to 60/40 v/v, e.g. 50/50 v/v.

The filler content in coatings of the present invention may be between 1 and 50 wt %, such as 1 to 50 wt %, e.g. 2 to 50 wt %, such as 3 to 50 wt %, e.g. 4 to 50 wt %, such as 5 to 50 wt %, e.g. 6 to 50 wt %, such as 7 to 50 wt %, e.g. 8 to 50 wt %, such as 9 to 50 wt %. Preferably the filler content in coatings of the present invention is 5-50 wt % such as at least 10 wt %, such as at least 11, 12, 13, 14, 15, 16, 17, 18 or 19 wt %. Thus the filler content in coatings of the present invention may be at least 20 wt %, such as at least 21, 22, 23, 24, 25, 26, 27, 28 or 29 wt %. In certain embodiments the filler content in coatings of the present invention is at least 30 wt %, such as 31, 32, 33, 34, 35, 36, 37, 38, 39, 40, 41, 42, 43, 44, 45, 46, 47, 48 or 49 wt %. In certain embodiments the filler content in coatings of the present invention may be as high as up to 50 wt %.

Styrene/acrylic-copolymer dispersions in water are preferred but in principle any solvent may be used.

Copolymers According to the Present Invention

Coatings of the present invention are based on styrene/acrylic-copolymers, which as will be illustrated below have shown to be highly effective as a high-friction, low-adhesion coating on surfaces. When applied on either directly on surfaces of cargo objects, on so-called friction sheets or on surfaces of transportation vehicles, this coating has many valuable properties, such as; heat, water, and scratch resistance.

In the context of the present invention Styrene/Acrylate copolymers are to be understood as polymers comprising styrene and a monomer selected from among acrylicacid, methacrylic acid or one of their simple esters. Apart from styrene and a monomer selected from among acrylicacid, methacrylic acid or one of their simple esters, co-polymers according to the present invention may also comprise minor amounts of other conventional monomers commonly used as co-monomers in acrylate polymers.

Styrene, also known as ethenylbenzene, vinylbenzene, and phenylethene, has the chemical formula C6H5CH=CH2. This derivative of benzene is the precursor to polystyrene and several copolymers, of which the following are mentioned for exemplary purposes only:
Poly(styrene-co-acrylonitrile),
Poly(styrene-co-allyl alcohol),
Poly(styrene-co-vinyl alcohol),
Poly(styrene-co-4-bromostyrene-co-divinyl benzene),
Poly(styrene-co-butadiene),
Poly(styrene-co-chloromethylstyrene),
Poly(styrene-co-4-chloromethylstyrene-co-4-methoxymethylstyrene),
Poly(styrene-co-maleic acid),
Poly(styrene-co-maleic anhydride),
Poly(styrene-alt-maleic anhydride),
Poly(styrene-co-methacrylic acid),
Poly(styrene-co-methyl methacrylate) and
Poly(styrene-co-α-methylstyrene).

Acrylate monomers are based on the structure of acrylic acid, which consists of a vinyl group and a carboxylic acid terminus. Other typical acrylate monomers are derivatives of acrylic acid, such as methyl methacrylate in which the vinyl hydrogen and the carboxylic acid hydrogen are both replaced by methyl groups, and acrylonitrile in which the carboxylic acid group is replaced by the related nitrile group. Additional examples of acrylate monomers are: Methacrylates, Methyl acrylate, Ethyl acrylate, 2-Ethylhexyl acrylate, Hydroxyethyl methacrylate, Butyl acrylate, Butyl methacrylate and Trimethylolpropane triacrylate. Acrylate monomers are used as a precursor to several copolymers, of which the following are mentioned for exemplary purposes only: Polyacrylates,
Poly(Ethylene-co-Acrylate),
Poly(Acrylate-co-polyvinylpyrrolidone),
Poly(Acrylate-co-vinyl alcohol),
Poly(Stearath-10 Allyl-co-Acrylate),
Poly(Acrylate-co-Stearath-20 Allyl),
Poly(Acrylate-co-Stearath-50 Allyl),
Poly(Styrene-co-Acrylate), and
Poly(polyvinylpyrrolidone-co-dimethylaminoethylmethacrylate).

The copolymers of the present invention would include inter alia:
Alternating copolymers with regular alternating Styrene and acrylate monomers
Periodic copolymers with Styrene and acrylate monomers arranged in a repeating sequence
Statistical copolymers in which the monomer-sequence is completely random
Block copolymers in which two or more homopolymer subunits are linked by covalent bonds.

The copolymers of the present invention would include inter alia:
Linear copolymers
Branched copolymers, including star copolymers, brush copolymers, and comb copolymers
Gradient copolymers.

Copolymers particularly preferred in the context of the present invention are characterized by having a molar ratio of acrylic parts to styrene parts of 5-50 mol %, such as 6-45 mol %, that is 7-40 mol %, e.g. 8-35 mol %, such as 9-30 mol %, that is 10-25 mol %, e.g. 11-20 mol %.

Copolymers particularly preferred in the context of the present invention are further characterized by having a $T_g$ of −30 to 50° C., such as −20 to 45° C., that is −10 to 40° C., e.g. −5 to 35° C., such as 0 to 30° C., that is 5 to 28° C., e.g. 10 to 25° C. Thus, copolymers having a $T_g$ of −10 to 50° C., such as 0 to 45° C., e.g. 5 to 35° C., such as 10 to 30° C., that is 15 to 25° C. are particularly preferred.

Styrene/Acrylate copolymers comprising Butyl methacrylate are particularly preferred for friction coatings and objects, e.g. friction sheets, coated at least partly with friction coatings according to the present invention.

Friction Coefficients of the Coatings of the Present Invention

A typical measurement series using a frictometer as described above is depicted in FIG. 1. The software logging is started at time=0. After 1.8 seconds the frictometer is turned on, and at 2 seconds the maximum coefficient of friction is obtained at the value 1.8, which is the equivalent to the static friction coefficient. After around 2.2 seconds, the dynamic friction coefficient is stabilized around the value 0.25.

The static friction coefficient measured for coatings according to the present invention using a frictometer as described above is as high as 2.97±0.09, which should be compared to the frictional coefficients obtainable with:
the coatings apparently applied for prior art paper-based friction sheets, which are reported to give rise to values ranging from app. 0.4 to 0.9,
coatings with different commercially available prior art polymers, which give rise to values ranging from app. 0.4 to 0.7, prior art rubber-based friction sheets, which are reported to give rise to values ranging from app. 0.6 to 1.0.

As also set out above, the same objects, e.g. the same sheets of paper or cardboard of the same type as used in the prior art can be coated with the polymers of the present invention, and may as in the prior art be coated with a wet layer thickness of app. 2 µm to 200 µm, which would in case of a polymer fraction of app 50% (v/v) correspond to a dry layer thickness of app. 1 µm to 100 µm, such as e.g. 2-50 µm, for instance 3-40 µm, e.g. 4-30 µm.

In this way static friction coefficients as high as 1.17 may be obtained with copolymers of the present invention, when tested immediately after application of a cargo model object.

Similar or higher values are observed for friction coatings according to the present invention when applying longer resting times, and under more complex conditions, e.g. a dusty/dirty floor and contact pressures as high as 280 g/cm$^2$.

Thus, testing with a model cargo object of a similar weight having rested on a object, e.g. a paper sheet, coated with a polymer coating according to the present invention for longer periods of time, show that the longer the object is standing stationary on the coated object, e.g. the paper sheet, the higher the static friction coefficient will be. When standing for around 1 day static friction coefficients as high as 3.3 may be obtained, without enhanced adhesion.

Measuring the static friction coefficient at various thicknesses of the coated layer according to the present invention shows a slight correlation between layer thickness and static friction coefficient, where a greater thickness result in higher static friction, whereas no apparent correlation between layer thickness and dynamic friction coefficient is observed.

A wear test of coatings according to the present invention shows that objects, e.g. sheets, coated with a coating according to the invention may in practice be used multiple times. Thus, multiple measurement runs in a frictometer using the same coated object, i.e. a sheet, did not affect neither static nor dynamic friction. To this end the dynamic friction coefficient was measured 20 times, where one measurement included pulling the measurement bed under a stationary weight one way to get a measurement and the other way to reset it.

A coated polymer surface according to the present invention can furthermore withstand heat. Thus, subjecting the coated surface to around 200° C. for around 10 seconds do not give rise to any signs of detachment of the coating from the coated object, just as it does not give rise to signs of any damage to the coating.

Thus, in a preferred embodiment, a heat sensitive coating (e.g. a PE coating), may be placed on the opposite side of the friction sheet (as compared to the coating of the present invention), which may, thus, subsequently be melted in order to glue the friction sheet onto the surface of a cargo object, without damaging the high friction coating of the present invention.

Aspects of the Present Invention

In a first aspect the present invention relates to an object the surface of which is at least partly coated with a friction coating, in the form of a styrene/acrylic copolymer, comprising 2 to 50 wt % of a filler, at a dry thickness (DFT) of at least 1 µm as measured by SSPC-PA 2, Australian Standard AS 3894.3, International Standard ISO 19840 and the International Maritime Organization (IMO) resolution MSC 215(88), and/or at a dry coating weight of at least 3 g coating/(m$^2$ coated surface) measured as the weight gain of the object per surface area, characterized in that said polymer has a molar ratio of acrylic parts relative to styrene parts of 5-50 mol % and a Tg of −5 to 28° C., and wherein the Tg is the temperature at the half-height of the heat capacity increase measured by a differential scanning calorimetry (DSC) analysis.

In a second aspect the present invention relates to an object in accordance with the above-mentioned first aspect further characterized in that said filler is a mixture comprising a silicon dioxide based filler and a calcium carbonate based filler, wherein the relative ratio of the silicon dioxide based filler to the calcium carbonate based filler is in a range from 1:1 to 1:3

In a third aspect the present invention relates to an object in accordance with any of the above-mentioned first or second aspects further characterized in that said styrene/acrylic copolymer comprises butylmethacrylate.

In a fourth aspect the present invention relates to an object the surface of which is at least partly coated to a dry thickness (DFT) of at least 1 µm as measured by SSPC-PA 2, Australian Standard AS 3894.3, International Standard ISO 19840 and the International Maritime Organization (IMO) resolution MSC 215(88), and/or at a dry weight of at least 3 g coating/(m$^2$ coated surface) measured as the weight gain of the object per surface area, with a friction coating in the form of a styrene/acrylic copolymer dispersion comprising a first styrene/acrylic copolymer dispersion having a molar ratio of acrylic parts relative to styrene parts of 5-50 mol %, and a Tg of 7.5-12.5° C., and a second styrene/acrylic copolymer dispersion having a molar ratio of acrylic parts relative to styrene parts of 5-50 mol %, and a Tg of 26-30° C., wherein said molar ratio of acrylic parts to styrene parts is higher for said first dispersion than for said second dispersion, and wherein the Tg is the temperature at the half-height of the heat capacity increase measured by a differential scanning calorimetry (DSC) analysis.

In a fifth aspect the present invention relates to an object in accordance with the above-mentioned fourth aspect further characterized in that said friction coating in the form of a styrene/acrylic copolymer dispersion further comprises a filler in an amount of 2 to 50 wt %

In a sixth aspect the present invention relates to an object in accordance with any of the above-mentioned fourth or fifth aspects, wherein said molar ratio of acrylic parts relative to styrene parts of said first dispersion is 25-50 mol %.

In a seventh aspect the present invention relates to an object in accordance with any of the above-mentioned fourth, fifth or sixth aspects, wherein said molar ratio of acrylic parts relative to styrene parts of said second dispersion is 5-25 mol %.

In an eighth aspect the present invention relates to an object in accordance with any of the above-mentioned fourth, fifth, sixth or seventh aspects, wherein said styrene/acrylic copolymer dispersion comprises less v/v of said first dispersion than of said second dispersion.

In a ninth aspect the present invention relates to an object in accordance with the above-mentioned eighth aspect, wherein the ratio of said first dispersion to said second dispersion is 20/80 v/v.

In a tenth aspect the present invention relates to an object in accordance with the above-mentioned fifth aspect further characterized in that said filler is a mixture comprising a silicon dioxide based filler and a calcium carbonate based filler, wherein the relative ratio of the silicon dioxide based filler to the calcium carbonate based filler is in a range from 1:1 to 1:3

In an eleventh aspect the present invention relates to an object in accordance with the above-mentioned tenth aspect, wherein said styrene/acrylic copolymer dispersion comprises more v/v of said first dispersion than of said second dispersion.

In a twelfth aspect the present invention relates to an object in accordance with the above-mentioned eleventh aspect, wherein the ratio of said first dispersion to said second dispersion is 70/30 v/v.

In a thirteenth aspect the present invention relates to an object in accordance with any of the above-mentioned third to twelfth aspects, wherein the acrylic part of said first and said second dispersion comprises butylmethacrylate.

In a fourteenth aspect the present invention relates to an object in accordance with any of the above-mentioned first to thirteenth aspects, further characterized in that said object is made from a cellulosic material.

In a fifteenth aspect the present invention relates to an object in accordance with the above-mentioned fourteenth aspect, further characterized in that said object is in the form of a sheet.

In a sixteenth aspect the present invention relates to an object in accordance with the above-mentioned fifteenth aspect, further characterized in that said sheet is made from paper or cardboard.

In a seventeenth aspect the present invention relates to the use of an object according to any of the proceeding claims for securing cargo during transport.

In an eighteenth aspect the present invention relates to a method of placing an object on a surface of a transportation vehicle to increase friction between transported cargo and the surface of a transportation vehicle during transport, wherein the object is in accordance with any of the above-mentioned first to sixteenth aspects.

In a nineteenth aspect the present invention relates to a friction coating made from a friction coating composition comprising a styrene/acrylic copolymer, comprising 2 to 50 wt % of a filler, said friction coating being coated at a dry thickness (DFT) of at least 1 µm as measured by SSPC-PA 2, Australian Standard AS 3894.3, International Standard ISO 19840 and the International Maritime Organization (IMO) resolution MSC 215(88), and/or at a dry coating weight of at least 3 g coating/(m² coated surface) measured as the weight gain of the object per surface area, characterized in that said polymer has a molar ratio of acrylic parts relative to styrene parts of 5-50 mol % and a Tg of −5 to 28° C., and wherein the Tg is the temperature at the half-height of the heat capacity increase measured by a differential scanning calorimetry (DSC) analysis.

In a twentieth aspect the present invention relates to a friction coating in accordance with the above-mentioned nineteenth aspect further characterized in that said filler is a mixture comprising a silicon dioxide based filler and a calcium carbonate based filler, wherein the relative ratio of the silicon dioxide based filler to the calcium carbonate based filler is in a range from 1:1 to 1:3.

In a twenty-first aspect the present invention relates to the use of a friction coating made from a friction coating composition comprising a styrene/acrylic copolymer and coated at a dry thickness (DFT) of at least 1 µm as measured by SSPC-PA 2, Australian Standard AS 3894.3, International Standard ISO 19840 and the International Maritime Organization (IMO) resolution MSC 215(88), and/or at a dry coating weight of at least 3 g coating/(m² coated surface) measured as the weight gain of the object per surface area, characterized in that said polymer has a molar ratio of acrylic parts relative to styrene parts of 5-50 mol % and a Tg of −5 to 28° C., for the coating of at least part of the surface of an object, wherein the Tg is the temperature at the half-height of the heat capacity increase measured by a differential scanning calorimetry (DSC) analysis.

In a twenty-second aspect the present invention relates to a use in accordance with the above-mentioned twenty-first aspect further characterized in that said friction coating composition comprises a filler in an amount of 2 to 50 wt %.

In a twenty-third aspect the present invention relates to a use in accordance with the above-mentioned twenty-second aspect further characterized in that said filler is a mixture comprising a silicon dioxide based filler and a calcium carbonate based filler, wherein the relative ratio of the silicon dioxide based filler to the calcium carbonate based filler is in a range from 1:1 to 1:3.

EXAMPLES

Below the benefits of coatings according to the present invention as compared to the coatings of the prior art is illustrated by a number of examples.

Example 1: Prior Art Polymers and Coatings

Based on the fact that the materials making up both the surfaces of most cargo object (whether as such or packaged on pallets), the cargo bed surfaces of most vehicles and one of the most common sheet materials used for friction sheets in the prior art is mainly based on cellulose, hemicellulose and/or lignin (and thus in most cases negatively charged), one might assume that polymers with a net positive charge would in general be good candidates for coating of these kinds of materials in that they would be thought to more readily attach to the surface of the sheet.

Thus, a set of 35 commercially available polymers all having positively charged functional groups were used to coat sheets of cardboard using dispersions at a concentration of 1 g of polymer powder in 50 ml of water and in a uniform wet layer thickness of 60 µm by use of the K Hand Coater from RK Print on cardboard material followed by drying at 150° C. for four minutes.

TABLE 2

Result of experiment clarifying ability to attach to paper/cardboard surface. Only the polymers in bold were found to attach to the paper/cardboard surface.

| | |
|---|---|
| 1 | BASF Magnafloc ® 351 |
| 2 | BASF Magnafloc ® 155 |
| 3 | BASF Magnafloc ® 292 |
| 4 | BASF Zetag ® 59 |
| 5 | BASF Zetag ® 7653 |
| 6 | BASF Zetag ® 7630 |
| 7 | BASF Zetag ® 43 |
| 8 | BASF Zetag ® 75F540 |
| 9 | BASF Zetag ® 7898 |
| 10 | BASF Zetag ® 7631 |
| 11 | BASF Zetag ® 7867F540 |
| 12 | BASF Zetag ® 7563 |
| 13 | BASF Zetag ® 63 |
| 14 | BASF Zetag ® 92 |
| 15 | BASF Zetag ® 63L |
| 16 | BASF Zetag ® 7587 |
| 17 | BASF Zetag ® 87 |
| 18 | BASF Zetag ® 57 |
| 19 | BASF Zetag ® 7623 |
| 20 | BASF Zetag ® 7633 |

TABLE 2-continued

Result of experiment clarifying ability to attach to paper/cardboard surface. Only the polymers in bold were found to attach to the paper/cardboard surface.

| | |
|---|---|
| 21 | BASF Zetag ® 7529 |
| 22 | BASF Zetag ® 7541 |
| 23 | BASF Zetag ® 7899 |
| 24 | BASFZetag ® 78671 |
| 25 | BASF Zetag ® 7878 |
| 26 | BASF Zetag ® 78F581 |
| 27 | BASF Zetag ® 689 |
| 28 | Kemira Superfloc ® 4816 RS |
| 29 | Kemira Superfloc ® C-446 |
| 30 | Kemira Superfloc ® SD-2083 |
| 31 | Kemira Superfloc ® C-2260 |
| 32 | Kemira Superfloc ® SD-2081 |
| 33 | Kemira Superfloc ® A-1883 RS |
| 34 | BASF Percol ® 63 |
| 35 | BASF Percol ® 163 |

Out of the 35 prior art polymers tested, only 12 did in fact (obvious from both a visual and a mechanical inspection of the samples) attach to the cardboard surface.

Samples of cardboard coated with above-mentioned 12 prior art polymers that had been found to attach to the surface of cardboard were subsequently subjected to friction measurements using a frictometer of the type described above and comprising the components shown in FIG. 3. The design makes use of a bed that slides under a stationary counterface made from a cargo model object (e.g. an authentic wooden pallet) with a weight block on top, which has a close to evenly distributed total mass. A thick wire is used to connect the load cell orthogonal to a low point at the stationary weight, in order to get a close to lossless connection with forces being evenly distributed while measuring. A thermal-block is mounted on top of the moving bed and connected to a temperature controlled water tank with a water pump. The water tank runs from room temperature up towards 100° C. by heating with a built-in water heater. To measure the frictional coefficients relevant for a given object, e.g. a sheet coated with a polymer coating, this is clamped tight to the thermal-block.

As the material of the stationary counterface is critical when measuring friction, a piece of pallet wood was chosen as a cargo model object, as this is the main material of the surface of cargo vehicle beds, and pallets, which would be the main contact materials for many of the envisaged uses of friction sheet coatings according to the present invention.

Figure 3:
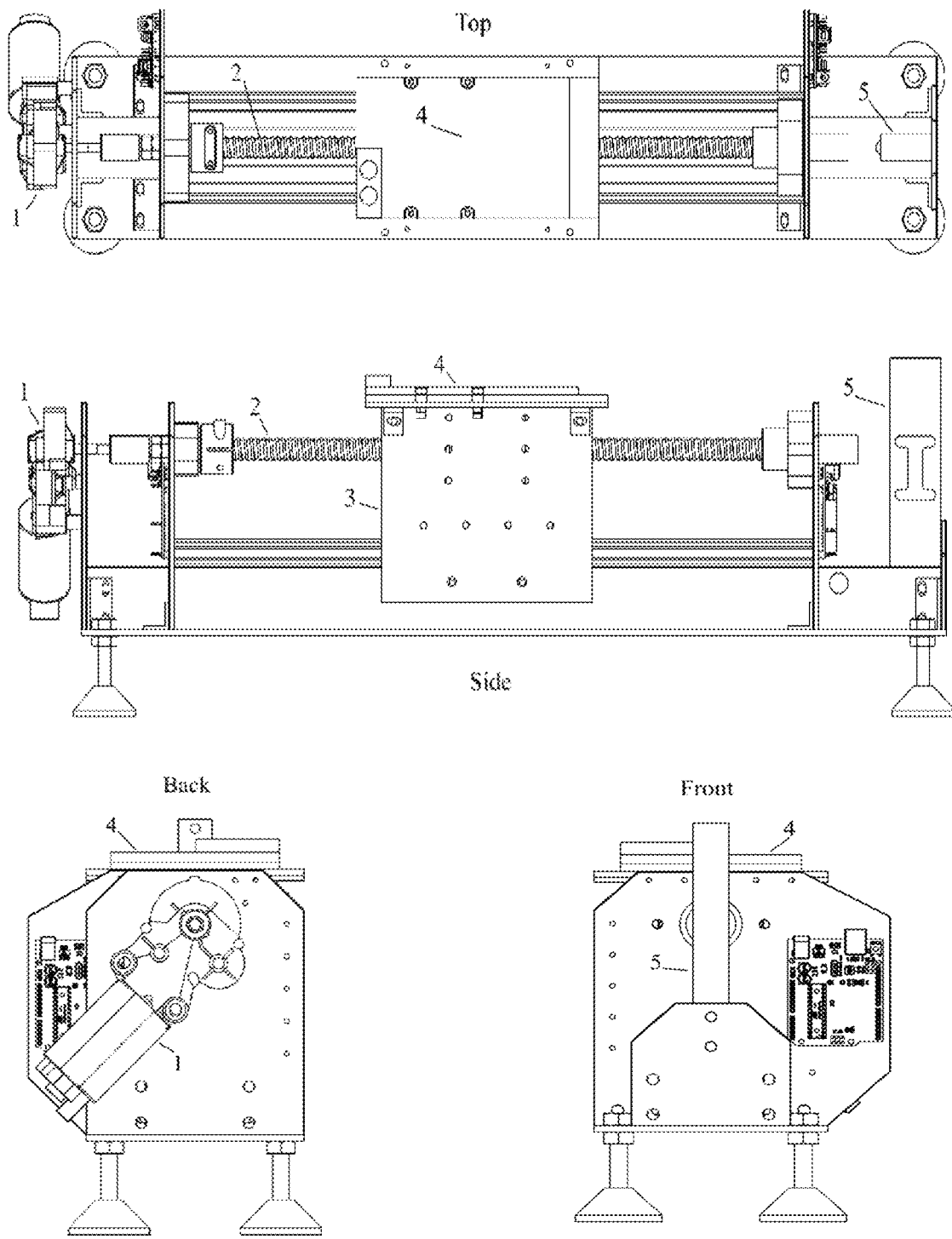
FIG. 3: Possible design of a frictometer comprising a DC-motor (1), which rotates a ballscrew (2), thus sliding the bed (3), containing a thermal-block (4), away from the load cell (5).

The connection of the DC-motor (1) of the frictometer shown in FIG. 3 to the system through gears ensures that the motor can run at full speed with maximum torque, while the moving bed slides only slowly. The DC-motor runs at full speed keeping the sliding speed constant throughout all measurements. At the same time, the force with which the cargo model object (piece of pallet wood) affects the sample, is recorded by the load cell (5) and send to the PC through an analog to digital converter. The weight (an aluminum block) has a close to evenly distributed total mass of 1.143 kg, resulting in a normal force of 11.2 N. The connection between the stationary weight and the load cell (5) is a thick wire, minimizing the loss of force between the stationary weight and the load cell (5).

The apparent contact area of the stationary counterface of the cargo model object (wooden pallet) and the coated cardboard/paper sheet is 110 cm$^2$. This results in a contact pressure of 10.4 g/cm$^2$, which is kept constant throughout the friction measurements.

Figure 4:
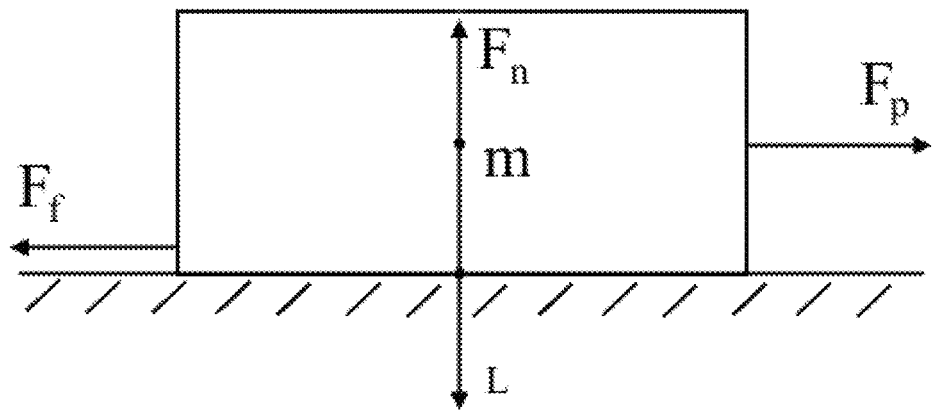
FIG. 4: Forces acting in Frictometer setup. A simple illustration of forces acting in Frictometer setup. $F_f$ is the frictional force, $F_n$ the normal force, L the load, $F_p$ the applied pulling force, and m the mass of the object.

The different forces acting in the frictometer set up are shown in FIG. 4. Of the forces depicted in FIG. 4 the PC only records the friction force. The recorded data will then be divided by the normal force which is equal to 11.2 N (1.1428 kg×9.8 m/s$^2$).

In order to have reliable friction information 6 different measurements were taken using two different cardboards samples coated at a thickness of 60 μm. The friction measurement were all done 24 hours after finalization of the coating (i.e. after the end of the drying step)

Out of the prior art polymer coatings tested on the frictometer only 12 were found to be usable as friction sheet coatings. The results (i.e. frictional coefficient if applicable) for all polymers tested are shown in Table 3.

TABLE 3

Static friction coefficient with a 60 μm coating (wet thickness) using prior art polymers.

| | No. | | | | | | | | | | | |
|---|---|---|---|---|---|---|---|---|---|---|---|---|
| | 8 | 9 | 11 | 23 | 24 | 25 | 26 | 28 | 30 | 31 | 32 | 33 |
| Friction | 0.56 | 0.61 | 0.74 | 0.55 | 0.55 | 0.59 | 0.66 | plow | 0.54 | 0.35 | 0.43 | plow |

As can be seen, coating with the prior art polymers gave rise to friction coefficients between 0.35 and 0.74, which seems to correspond well to the values reported for the paper and cardboard based friction sheets commercially available from e.g. CGP and W.Bosch+Co (see above).

Example 2: Coatings and Polymers According to the Present Invention

As set out above coatings of the present invention are based on styrene/acrylic-copolymers.

A styrene/acrylic-copolymer dispersion in water based on two individual dispersions, A and B, is prepared. Both dispersion A and B are made of styrene/acrylic-copolymer, where the ratio between the styrene and acrylic parts of these dispersions determine the hardness/smoothness of the surface. Greater amount of styrene will increase the rigidity of the molecular structure, thus making the surface harder, and in the end reduce the adhesive character of the coating.

Blank sheets of paper of the same paper type used for the coating with prior art polymers are used for the coating with the polymers of the present invention.

In addition to the coating experiments conducted with the prior art polymers described above (i.e. using a K Hand Coater from RK Print) also full scale coating was done with the polymers of the present invention.

Figure 5:
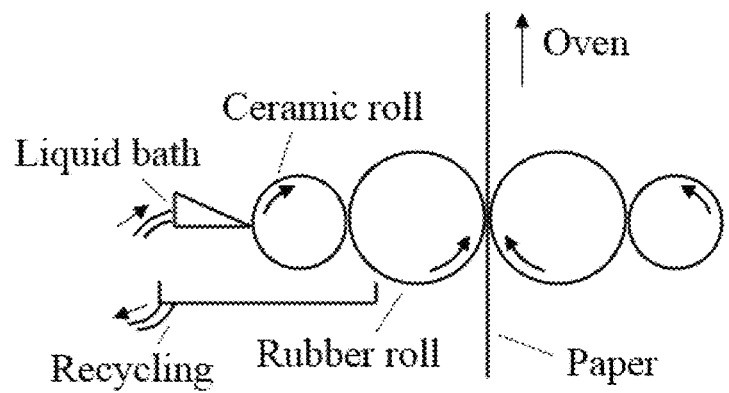
FIG. 5: Example of an industrial scale coating equipment.
Figure 6A:
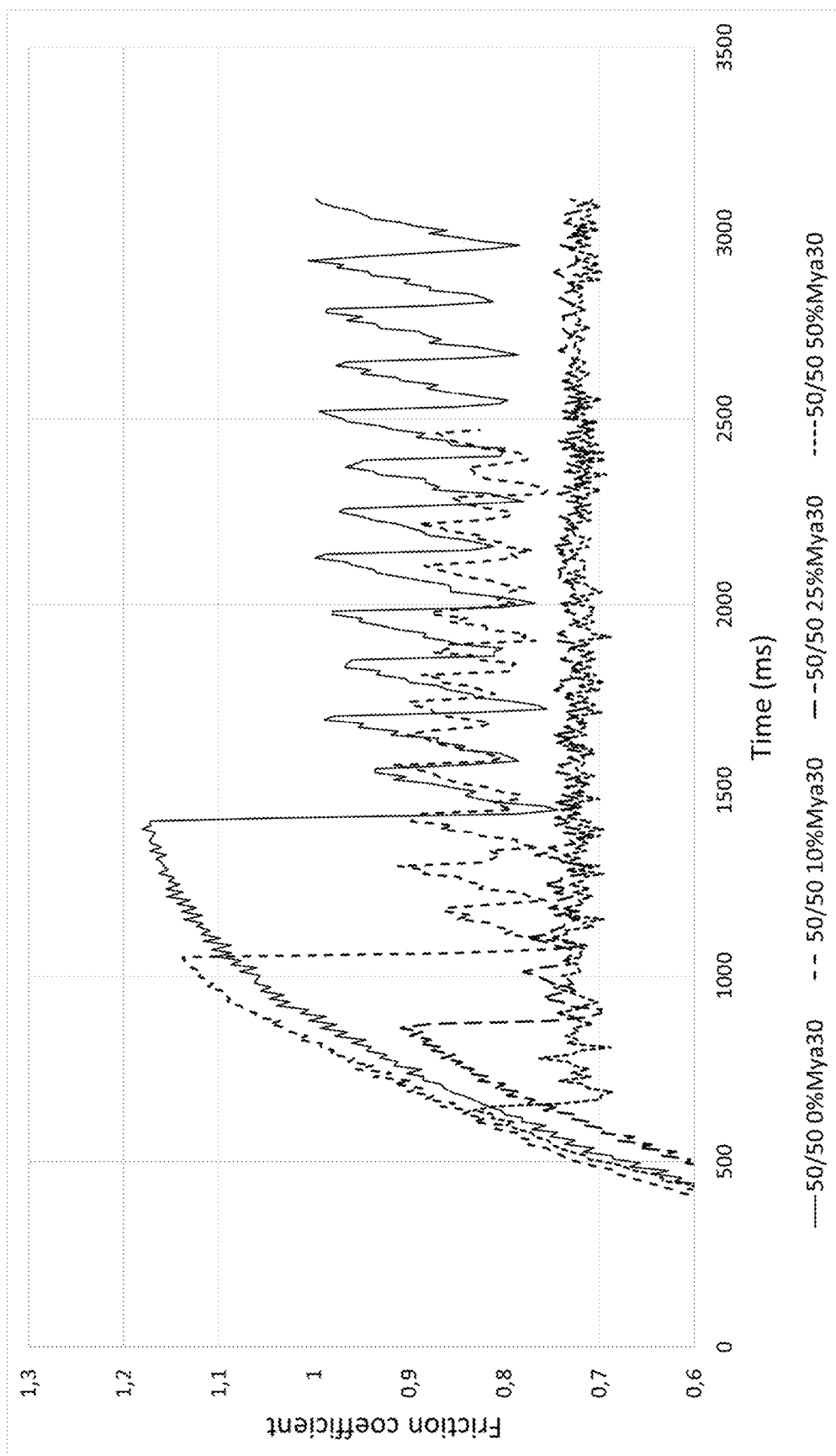
FIG. 6a: Friction coefficients measured for a dispersion comprising a 50/50 mixture of dispersions A and B, i.e. the ratio of polymer dispersion A (high ratio between acrylic and styrene parts) to dispersion B (low ratio between acrylic and styrene parts), and 0, 10, 25 and 50 wt % of MYANIT™ 0-30 (Mya30), respectively.
Figure 6B:
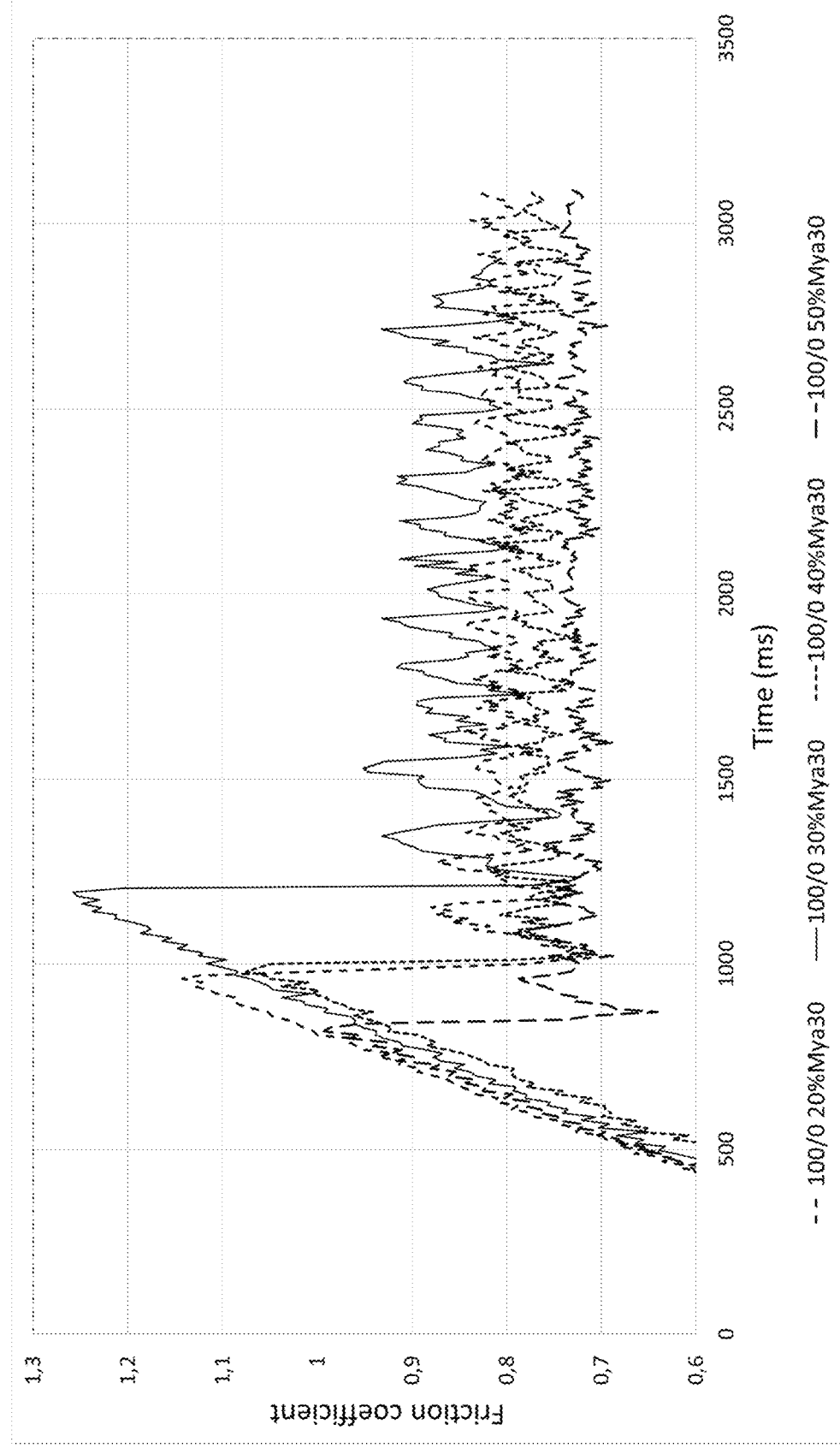
FIG. 6b: Friction coefficients measured for a dispersion comprising a 100/0 mixture of dispersions A and B, i.e. the ratio of polymer dispersion A (high ratio between acrylic and styrene parts) to dispersion B (low ratio between acrylic and styrene parts), and 20, 30, 40 and 50 wt % of MYANIT™ 0-30 (Mya30), respectively.
Figure 6C:
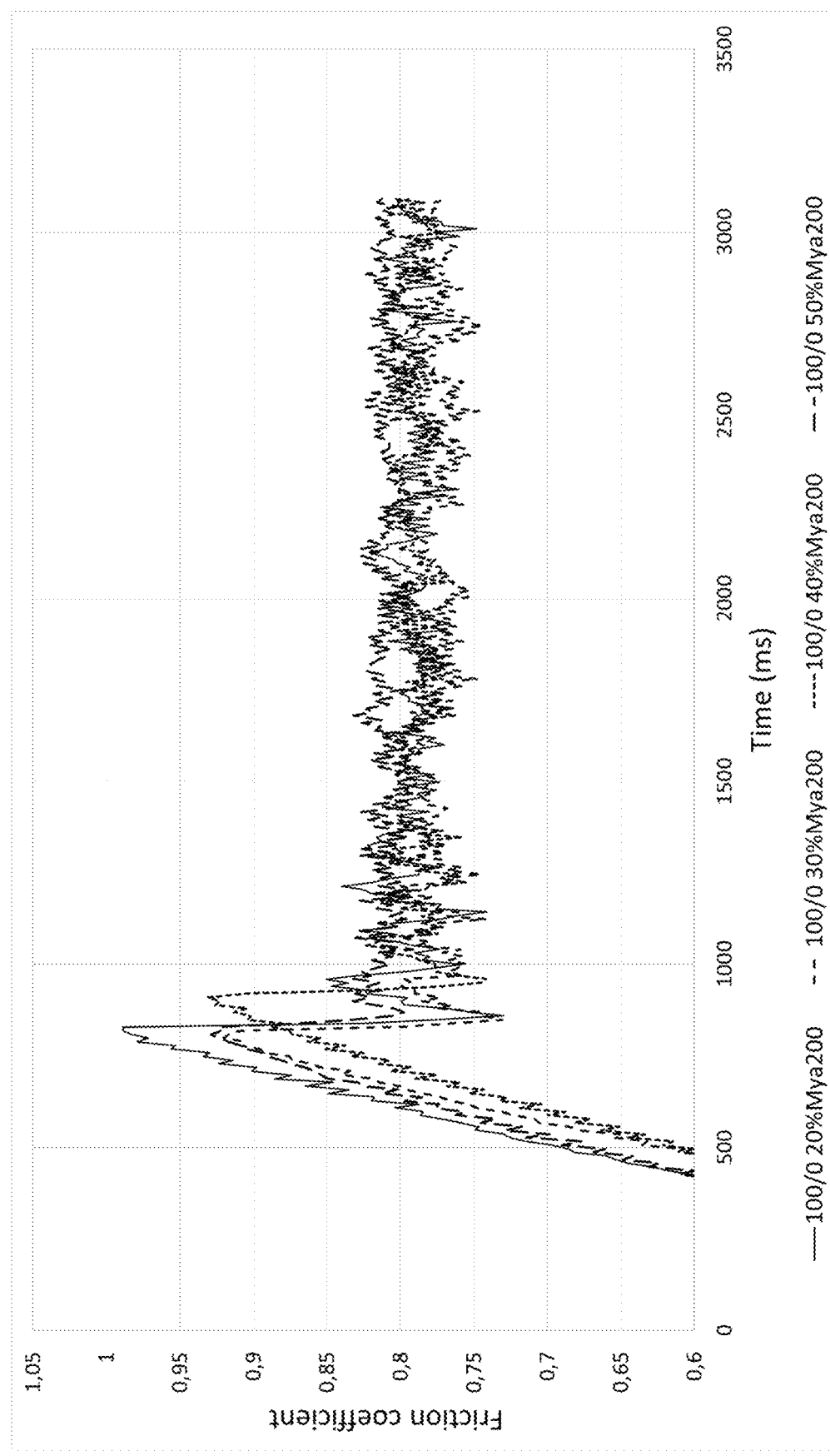
FIG. 6c: Friction coefficients measured for a dispersion comprising a 100/0 mixture of dispersions A and B, i.e. the ratio of polymer dispersion A (high ratio between acrylic and styrene parts) to dispersion B (low ratio between acrylic and styrene parts), and 20, 30, 40 and 50 wt % of MYANIT™ 0-200 (Mya200), respectively.
Figure 6D:
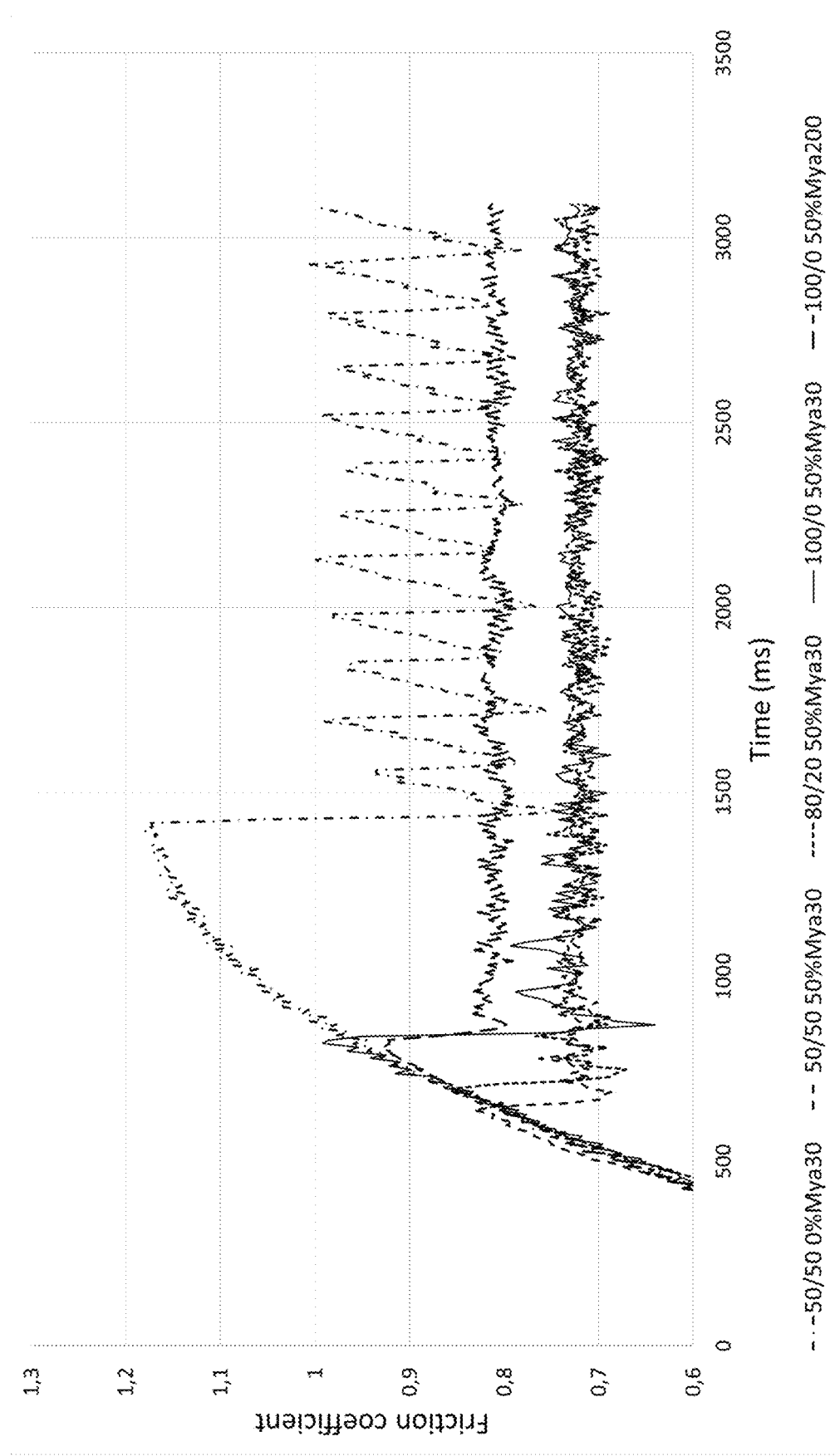
FIG. 6d: Friction coefficients measured for a dispersion comprising either a 50/50 a 80/20 or a 100/0 mixture of dispersions A and B, i.e. the ratio of polymer dispersion A (high ratio between acrylic and styrene parts) to dispersion B (low ratio between acrylic and styrene parts), and 0 or 50 wt % of MYANIT™ 0-30 (Mya30) or MYANIT™ 0-200 (Mya200), respectively.

The process equipment used to continuously coat an industrial sized roll of paper or cardboard was composed like an offset press, where the coating is printed onto the paper. The coating section is illustrated in FIG. 5. The blank paper is fed from a roll to the coating section, where a continuously recycled flow of liquid coating dispersion is deposited to a ceramic roll engraved with small oval indentations. These indentations are filled with the liquid coating dispersion and then deposited onto a counter rotating rubber roll, which then prints the dispersion to the paper. Between the ceramic roll and the rubber roll is a buildup of dispersion that can be regulated in depth by adjusting the position of the ceramic roll relative to the rubber roll. The whole coating setup is mirrored and copied to the opposite side of the paper in order to be able to double coat the paper. The paper runs continuously through the coating section after which it reaches a double sided vertical wall of heating elements constituting an oven.

The ratio of dispersion A (high ratio between acrylic and styrene parts, i.e. app 25-50 mol % and $T_g$ of app. 5-10° C.) and dispersion B (low ratio between acrylic and styrene parts, i.e. app. 5-25 mol % and $T_g$ of app 24-28° C.) defines the NB ratio of the resulting dispersion. The first dispersion was pure dispersion A. This dispersion showed very high adhesion between coated sheets, when stacked on top of each other. Dispersion B was mixed with dispersion A in order to reduce stickiness. The next three test compositions had an increased amount of dispersion B. None of them was sticky and the best static friction was observed with the lowest amount of dispersion B. Three new samples were then made, now with decreasing amount of dispersion B, which showed that none of them were sticky. The best friction coefficients were observed with the lowest amount of dispersion B. By lowering the amount of dispersion B to less than 20%, the coated surface began to stick to other sheets of paper.

Like in the experiments with the prior art the sheets were coated with an apparent (wet) layer thickness of 60 μm (corresponding to a dry thickness of app. 30 μm). The static friction coefficient showed an increase with lower amount of dispersion B. The static friction was not measured for the sticky A/B-ratios. The results are shown in Table 4.

TABLE 4

Friction and adhesion results from various A/B-ratios.

| A/B-ratio | Sticky | Static friction coeff. (resting time 30 s) |
|---|---|---|
| 20/80 | no | 0.78 ± 0.04 |
| 33/66 | no | 0.74 ± 0.09 |
| 50/50 | no | 1.00 ± 0.11 |
| 60/40 | no | 0.89 ± 0.14 |
| 70/30 | no | 1.02 ± 0.19 |
| 80/20 | no | 1.17 ± 0.21 |
| 90/10 | yes | — |
| 95/5 | yes | — |
| 100/0 | yes | — |

The static friction coefficient was also tested with the cargo model object (wood block) resting on the coated paper sheet for around 1 day. This was only tested for the ratio 80/20 (9 (+/−2)° C.), with a static friction coefficient result of 3.3–2.9 (+/−0.1). The $T_g$ for the 20/80 ratio was determined to be 22(+/−2)° C. Similar or higher values were observed for friction coatings according to the present invention under more complex conditions, e.g. a dusty/dirty floor and contact pressures as high as 280 g/cm², even as high as above 300 g/cm².

The static friction coefficient was measured at various wet thicknesses of the coated layer: 12, 24, 40, and 60 μm (corresponding to a dry thickness of app 6, 12, 20 and 30 μm, respectively). Three different test formulations were used. Two tests were done with different resting times; one with 30 s and one with 480 s. A slight correlation between layer thickness and static friction coefficient was found, where a greater thickness result in higher friction. Also the dynamic friction was tested at various thicknesses of the coated layer with a resting time of 30 seconds. No apparent correlation between layer thickness and dynamic friction coefficient was observed.

The actual weight gain of the paper, when the coating is applied and then dried was measured by using a hollow punch cutter to punch out 10 pieces of the paper sheet. The punch cutter has an inner diameter of 15.0 mm, so the area of a single punched piece of paper is 1.77 cm². The 10 pieces are measured together on an analytical balance with 0.1 mg readability. The dry coated weight of the K bars; 24, 40, and 60 μm varied between app 2 and 23 g/(m² coated surface).

The fraction of polymer vs. solvent in the dispersion used for coating, wherein the dispersion had an A/B-ratio of 80/20, was determined by drying the polymer for around 1 day at 110-130° C. Three beakers; empty, with polymer dispersion, and with dried polymer is then weighed and the polymer fraction was calculated to 49.250+/−0.006%.

A wear test was done to determine whether multiple measurement runs had an effect on friction. The dynamic friction coefficient was measured 20 times on a coating with an NB-ratio of 50/50, with apparent wet layer thickness of 60 μm (corresponding to a dry thickness of app. 30 μm) and with a resting time of 30 s, where one measurement included pulling the measurement bed under the stationary weight one way to get a measurement and the other way to reset it. It was evident that several measurement runs over the same surface did not diminish the dynamic friction. The average dynamic friction coefficient was 0.35±0.01, whereas the static friction (measured simultaneously with the dynamic friction), showed an average of 0.75±0.17. Thus, neither the static friction nor the dynamic friction is diminished with multiple runs of friction sheets coated with coatings according to the present invention.

To test whether the coated polymer surface of the present invention can withstand high heat, a simple test with a household iron was conducted. The iron was heated to its maximum performance at 180-190° C. and pressed directly onto the surface for around 10 seconds. The temperature was measured using an IR thermometer gun. The coating showed no sign of detachment from the paper sheet and did not seem to be damaged. A PE coating, placed on the opposite side of the sheet (as compared to the high friction coating), melted as intended and glued together two sheets of paper, without the high friction coating interfering with this process.

In addition friction coatings of the present invention were tested at temperatures as low as −20° C. with no apparent effect on the static friction coefficient.

The static friction coefficient obtained with sheets according to the present invention may be as high as 2.97±0.09 and are all above 0.74, which should be compared to both results obtainable with both prior art polymers, which give rise to values ranging from 0.4 to 0.74, and friction sheets already commercially available, which are reported to have values of above 0.60. Furthermore, the coatings and friction sheets of the present invention are shown to be both heat and wear resistant and durable.

Example 3: Coatings Containing MYANIT

Coatings of the present invention based on styrene/acrylic copolymers and at least one filler.

Friction coatings according to the present invention were tested with the commercially available products MYANIT™ from JANCON ApS as filler material. The friction measurements were done using a setup as set out in the previous examples, with a contact pressure of above 300 g/cm2.

Two qualities of MYANIT™ A were tested, MYANIT™ 0-30 (Mya30) and MYANIT™ 0-200 (Mya200). MYANIT™ contents were tested in the range of 10% to 50% in copolymer dispersions with various A/B-ratios. The results are shown in FIG. 6a-d.

Example 4: Coatings Comprising Rollovit

Coatings of the present invention based on styrene/acrylic copolymers and at least one filler.

Friction coatings according to the present invention were tested with the commercially available product Rollovit™ 0-30 μm from Lhoist as filler material. The friction measurements were done using a setup as set out in the previous examples, with contact pressure of above 300 g/cm2.

The results were as follows:

| Wet coating thickness | A/B-ratio | Resting time (s) | Rollovit amount (wt %) | Static friction coefficient |
|---|---|---|---|---|
| 24 μm | 50/50 | 15 | 0 | 1.32 ± 0.02 |
|  |  | 180 | 0 | 1.67 ± 0.03 |
|  | 20/80 | 15 | 0 | 1.05 ± 0.03 |
|  |  | 180 | 0 | 1.19 ± 0.03 |
|  |  | 15 | 10 | 1.09 ± 0.03 |
|  |  | 180 | 10 | 1.33 ± 0.03 |
| 60 μm | 50/50 | 180 | 0 | 1.86 ± 0.03 |
|  | 20/80 | 180 | 0 | 1.17 ± 0.01 |
|  |  | 180 | 10 | 1.25 ± 0.03 |

Example 5: Adhesion Measurement Procedure

Figure 7:
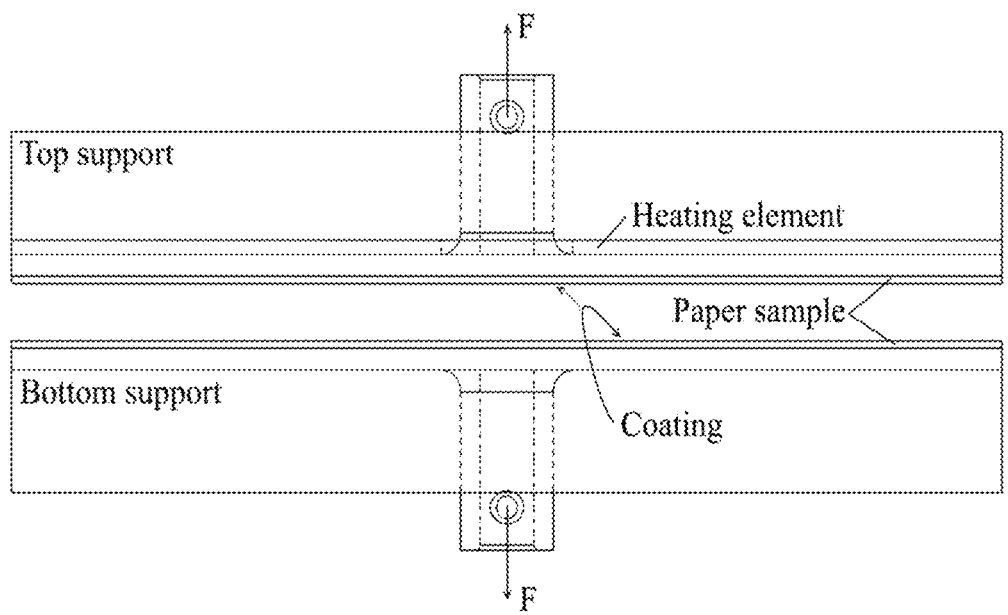
FIG. 7: Tensile tester (Zwick Roell Z0.5, Zwick, Germany) fitted with a 500 N load cell and custom made aluminum supports with paper samples. The top support is fitted with a 100 W silicon heat-pad and a thermocouple both connected to a temperature controller (XMT-7100 PID).

A tensile tester (Zwick Roell Z0.5, Zwick, Germany) fitted with a 500 N load cell and custom made aluminum supports is shown in FIG. 7. It consist of two flat plates (150.0 cm$^2$) on which paper sheets can be clamped. Pulling them apart yields a macroscale adhesion measurement.

The top support is fitted with a 100 W silicon heat-pad and a thermocouple both connected to a temperature controller (XMT-7100 PID). After mounting the papers on the supports are pressed together to a contact pressure of 68.0±10.2 g/cm$^2$. The pressure is held for 46 hours (i.e. 2 days). Subsequently the supports are separated at 50.0 mm/s. If the papers do not show damages they are considered to not "block", and they pass the test. If desired the apparent work required to separate the two plates is calculated by numerical integration of the resulting force vs. distance curve.

Example 6: Adhesion of Coatings Comprising Rollovit

Coatings of the present invention based on styrene/acrylic copolymers and at least one filler.

Figure 8:
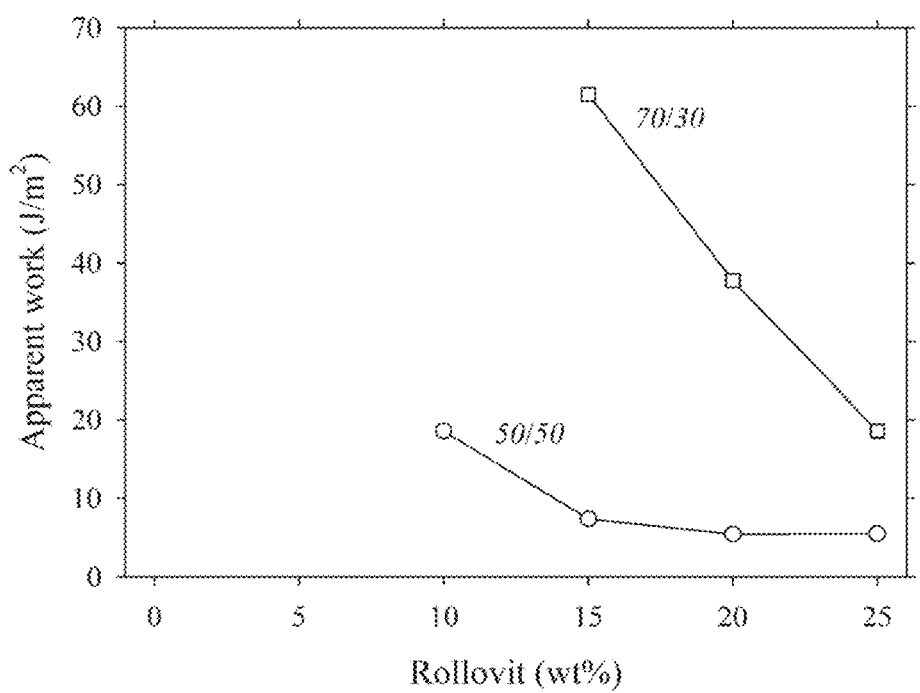
FIG. 8: Work needed to separate polymer/polymer interface by varying the amount of Rollovit added to the coating. 50/50 and 70/30. 30 μm $L_D$ and 46 hour resting time.

Friction coatings according to the present invention were tested with the commercially available product Rollovit™ 0-30 μm from Lhoist as filler mater. In order to determine at what point the addition of Rollovit decreases the adhesion to a satisfactory level, the adhesion was measured for 50/50 and 70/30 coatings with various amounts of Rollovit added. The work needed to separate polymer/polymer interfaces as a function of varying the amount of Rollovit added to the coating is shown in FIG. 8.

All 70/30 coatings showed unacceptable amounts of damage. 50/50 coatings without filler and up to containing 10 wt % Rollovit did not pass the adhesion test. 50/50 coatings containing 15 wt % or more Rollovit all passed the adhesion test. $\mu_s$ for the 50/50 coating without fillers was 1.86±0.03 (60 μm WFT, 180 s resting time, contact load of 307 g/cm$^2$). The $\mu_s$-value for a 20/80 coating without fillers, under similar conditions, was decreased significantly to 1.17±0.01. Again, by adding 10 wt % Rollovit the 20/80 coating had an increase in $\mu_s$ to a value of 1.25±0.03.

Example 7: Coatings Comprising Myanit

The variation in $\mu_d$ with the A/B-ratio and Myanit fillers added, i.e. the $\mu_d$ of various compositions containing Myanit and Rollovit fillers (24 μm WFT, contact load of 307 g/cm$^3$, and sled velocity of 100 mm/min) is summarized below:

| A/B-ratio | Myanit30 (wt %) | Myanit200 (wt %) | Rollovit (wt %) | $\mu_d$ |
|---|---|---|---|---|
| 50/50 | 0 | 0 | 0 | 0.88 ± 0.01 |
| 50/50 | 10 | 0 | 0 | 0.82 ± 0.01 |
| 50/50 | 25 | 0 | 0 | 0.76 ± 0.02 |
| 50/50 | 50 | 0 | 0 | 0.73 ± 0.01 |
| 100/0 | 30 | 0 | 0 | 0.93 ± 0.04 |
| 100/0 | 40 | 0 | 0 | 0.77 ± 0.01 |
| 100/0 | 50 | 0 | 0 | 0.73 ± 0.01 |
| 100/0 | 0 | 30 | 0 | 0.78 ± 0.01 |
| 100/0 | 0 | 50 | 0 | 0.82 ± 0.01 |
| 60/40 | 0 | 5 | 10 | 0.67 ± 0.01 |
| 60/40 | 0 | 10 | 10 | 0.74 ± 0.01 |

Example 8: Coatings Comprising Perlite and Rollovit

Static and dynamic friction together with a 2-day adhesion test was done for various compositions. The static and dynamic friction coefficient of various compositions containing Perlite and Rollovit fillers (DFT 30 μm, contact pressure 307 g/cm$^3$, adhesion temperature 25° C.) is shown below.

| A/B-ratio | Perlite wt % | Rollovit wt % | Static friction coeff. (10 s) | Dynamic friction coeff. | Adhesion 2-day test |
|---|---|---|---|---|---|
| 50/50 | 0 | 0 | 1.40 ± 0.01 | 0.83 ± 0.02 | Not pass |
| 50/50 | 1 | 0 | 1.30 ± 0.02 | 0.85 ± 0.00 | Not pass |
| 50/50 | 5 | 0 | 1.25 ± 0.02 | 0.82 ± 0.00 | Not pass |
| 50/50 | 10 | 0 | 1.07 ± 0.01 | 0.78 ± 0.01 | Pass |
| 70/30 | 6 | 6 | 1.21 ± 0.03 | 0.80 ± 0.02 | Pass |

Example 9: Coatings Comprising Perlite and Rollovit

Static and dynamic friction measurements, together with a 46-hour adhesion test was carried out for various compositions containing Perlite and Rollovit filler. The static and dynamic friction coefficient for various compositions containing Perlite and Rollovit fillers is shown below (60 μm WFT, contact load of 307 g/cm$^3$, resting time 10 s, sled velocity of 100 mm/min, and adhesion temperature 25° C. A (+) indicates a passed adhesion test and (−) not passed).

| A/B-ratio | Perlite (wt %) | Rollovit (wt %) | $\mu_s$ | $\mu_d$ | Apparent work, 46 h (J/m$^2$) |
|---|---|---|---|---|---|
| 50/50 | 0 | 0 | 1.40 ± 0.01 | 0.83 ± 0.02 | (−) |
| 50/50 | 1 | 0 | 1.30 ± 0.02 | 0.85 ± 0.00 | (−) |
| 50/50 | 5 | 0 | 1.25 ± 0.02 | 0.82 ± 0.00 | 11.9 (−) |
| 50/50 | 10 | 0 | 1.07 ± 0.01 | 0.78 ± 0.01 | 0.5 (+) |
| 70/30 | 6 | 6 | 1.21 ± 0.03 | 0.80 ± 0.02 | 8.4 (−) |
| 70/30 | 6 | 12 | 1.24 ± 0.01 | 0.83 ± 0.00 | 9.9 (+)[a] |
| 80/20 | 5 | 10 | — | — | 22.2 (−) |

[a] Was measured at 70 h.

Example 10: Water Absorptiveness

The tendency to absorb water (i.e. the water absorptiveness) of various coatings was measured using Cobb60 in accordance with ISO 535:2014(E). Coating is expressed as WFT. RR indicates that the coating was applied by Reverse Rotogravure.

| Coating | Water absorptiveness (g/m$^2$) |
|---|---|
| No coating, white side | 144.4 |
| No coating, brown side | 28.1 |
| 50/50, 24 μm | 0.4 |
| 100/0, 24 μm | 0.6 |
| Myanit30 20 wt %, 100/0, 24 μm | 1.1 |
| Myanit30 50 wt %, 50/50, 24 μm | 1.3 |
| Myanit200 20 wt %, 100/0, 24 μm | 0.7 |
| Myanit200 50 wt %, 50/50, 24 μm | 1.8 |
| Rollovit 10 wt %, 60/40, 60 μm | 0.3 |
| Rollovit 20 wt %, 60/40, 60 μm | 0.3 |
| Perlite 10 wt %, 50/50, 60 μm | 1.2 |
| RR, 60/40 | 0.6 |
| RR, 6 wt % Perlite, 12 wt % Rollovit, 70/30 | 1.1 |
| RR, 15 wt % Rollovit, 70/30 | 0.7 |
| RR, 15 wt % Rollovit, 50/50 | 0.6 |
| RR, PE-side | 0.1 |

The results for uncoated paper showed that the white side of the paper absorbed 144 g/m$^2$. The brown side of the paper absorbed 28 g/m$^2$, thus the white side absorbs around five times as much water as the brown side. For the coated paper superior values between 0.3 and 1.8 g/m2 were observed for various thicknesses and filler concentrations.

The invention claimed is:

1. An object comprising a surface which is at least partly coated with a friction coating having a minimum static friction coefficient of 0.6, wherein said friction coating is in the form of a styrene/acrylic copolymer, comprising 2 to 50 wt % of a filler, at a dry thickness (DFT) of at least 1 μm as measured by SSPC-PA 2, Australian Standard AS 3894.3, International Standard ISO 19840 and the International Maritime Organization (IMO) resolution MSC 215(88), and/or said surface is at least partly coated at a dry coating weight of at least 3 g coating/(m$^2$ coated surface) measured as the weight gain of the object per surface area,
wherein said polymer has a molar ratio of acrylic parts relative to styrene parts of 5-50 mol % and a Tg of −5 to 28° C., wherein the Tg is the temperature at the half-height of the heat capacity increase measured by a differential scanning calorimetry (DSC) analysis, and
wherein said filler is a mixture comprising a silicon dioxide based filler and a calcium carbonate based filler, wherein the relative ratio of the silicon dioxide based filler to the calcium carbonate based filler is in a range from 1:1 to 1:3.

2. An object according to claim 1, wherein said filler is a mixture comprising a silicon dioxide based filler and a calcium carbonate based filler, wherein the relative ratio of the silicon dioxide based filler to the calcium carbonate based filler is in a range from 1:1.5 to 1:2.5.

3. An object according to claim 1, wherein said styrene/acrylic copolymer comprises butylmethacrylate.

4. An object comprising a surface which is at least partly coated to a dry thickness (DFT) of at least 1 μm as measured by SSPC-PA 2, Australian Standard AS 3894.3, International Standard ISO 19840 and the International Maritime Organization (IMO) resolution MSC 215(88), and/or at a dry weight of at least 3 g coating/(m$^2$ coated surface) measured as the weight gain of the object per surface area, with a friction coating having a minimum static friction coefficient of 0.6 in the form of a styrene/acrylic copolymer dispersion comprising
a first styrene/acrylic copolymer dispersion having a molar ratio of acrylic parts relative to styrene parts of 5-50 mol %, and a Tg of 7.5-12.5° C.,
a second styrene/acrylic copolymer dispersion having a molar ratio of acrylic parts relative to styrene parts of 5-50 mol %, and a Tg of 26-30° C., and
a styrene/acrylic copolymer dispersion further comprises a filler in an amount of 2 to 50 wt %, wherein said filler is a mixture comprising a silicon dioxide based filler and a calcium carbonate based filler, wherein the relative ratio of the silicon dioxide based filler to the calcium carbonate based filler is in a range from 1:1 to 1:3,
wherein said molar ratio of acrylic parts to styrene parts is higher for said first dispersion than for said second dispersion,
wherein the Tg is the temperature at the half-height of the heat capacity increase measured by a differential scanning calorimetry (DSC) analysis.

5. An object according to claim 4, wherein said friction coating in the form of a styrene/acrylic copolymer dispersion further comprises a filler in an amount of 10 to 50 wt %.

6. An object according to claim 4, wherein said molar ratio of acrylic parts relative to styrene parts of said first styrene/acrylic copolymer dispersion is 25-50 mol %.

7. An object according to claim 4, wherein said molar ratio of acrylic parts relative to styrene parts of said second styrene/acrylic copolymer dispersion is 5-25 mol %.

8. An object according to claim 4, wherein said styrene/acrylic copolymer dispersion comprises less v/v of said first styrene/acrylic copolymer dispersion than of said second styrene/acrylic copolymer dispersion.

9. An object according to claim 8, wherein the ratio of said first styrene/acrylic copolymer dispersion to said second styrene/acrylic copolymer dispersion is 20/80 v/v.

10. An object according to claim 4, wherein said filler is a mixture comprising a silicon dioxide based filler and a calcium carbonate based filler, wherein the relative ratio of the silicon dioxide based filler to the calcium carbonate based filler is in a range from 1:1.5 to 1:2.5.

11. An object according to claim 10, wherein said styrene/acrylic copolymer dispersion comprises more v/v of said first styrene/acrylic copolymer dispersion than of said second styrene/acrylic copolymer dispersion.

12. An object according to claim 11, wherein the ratio of said first styrene/acrylic copolymer dispersion to said second styrene/acrylic copolymer dispersion is 70/30 v/v.

13. An object according to claim 4, wherein the acrylic part of said first styrene/acrylic copolymer dispersion and said second styrene/acrylic copolymer dispersion comprises butylmethacrylate.

14. An object according to claim 1, wherein said object is made from a cellulosic material.

15. An object according to claim 14, wherein said object is in the form of a sheet.

16. An object according to claim 15, wherein said sheet is made from paper or cardboard.

17. An object according to claim 4, wherein said object is made from a cellulosic material.

18. An object according to claim 17, wherein said object is in the form of a sheet.

19. An object according to claim 18, wherein said sheet is made from paper or cardboard.

20. A method of increase friction between transported cargo and the surface of a transportation vehicle during transport comprising placing an object on a surface of a transportation vehicle and transporting said object, wherein the object is an object according to claim 1.

21. A method of increase friction between transported cargo and the surface of a transportation vehicle during transport comprising placing an object on a surface of a transportation vehicle and transporting said object, wherein the object is an object according to claim 1.

22. A friction coating having a minimum static friction coefficient of 0.6 comprising a friction coating composition comprising a styrene/acrylic copolymer, comprising 2 to 50 wt % of a filler, said friction coating being coated at a dry thickness (DFT) of at least 1 μm as measured by SSPC-PA 2, Australian Standard AS 3894.3, International Standard ISO 19840 and the International Maritime Organization (IMO) resolution MSC 215(88), and/or said friction coating being coated at a dry coating weight of at least 3 g coating/ ($m^2$ coated surface) measured as the weight gain of the object per surface area, wherein said polymer has a molar ratio of acrylic parts relative to styrene parts of 5-50 mol % and a Tg of −5 to 28° C. wherein the Tg is the temperature at the half-height of the heat capacity increase measured by a differential scanning calorimetry (DSC) analysis, and wherein said filler is a mixture comprising a silicon dioxide based filler and a calcium carbonate based filler, wherein the relative ratio of the silicon dioxide based filler to the calcium carbonate based filler is in a range from 1:1 to 1:3.

23. Friction coating according to claim 22, wherein said filler is a mixture comprising a silicon dioxide based filler and a calcium carbonate based filler, wherein the relative ratio of the silicon dioxide based filler to the calcium carbonate based filler is in a range from 1:1.5 to 1:2.5.

* * * * *